United States Patent
Meikle

(10) Patent No.: US 11,762,530 B2
(45) Date of Patent: Sep. 19, 2023

(54) INTERFACE FOR RADIAL SELECTION OF TIME-BASED EVENTS

(71) Applicant: Legacy Productions, Inc., Minneapolis, MN (US)

(72) Inventor: Mark Jardine Meikle, Chanhassen, MN (US)

(73) Assignee: Legacy Productions, Inc., Minneapolis, MN (US)

(*) Notice: Subject to any disclaimer, the term of this patent is extended or adjusted under 35 U.S.C. 154(b) by 517 days.

(21) Appl. No.: 16/782,799

(22) Filed: Feb. 5, 2020

(65) Prior Publication Data

US 2021/0240311 A1    Aug. 5, 2021

(51) Int. Cl.
| G06F 3/0482 | (2013.01) |
| G06F 3/0485 | (2022.01) |
| G06F 3/16 | (2006.01) |

(52) U.S. Cl.
CPC .......... *G06F 3/0482* (2013.01); *G06F 3/0485* (2013.01); *G06F 3/165* (2013.01)

(58) Field of Classification Search
CPC .............................. G06F 3/0482; G06F 3/165
See application file for complete search history.

(56) References Cited

U.S. PATENT DOCUMENTS

| 5,499,040 | A | 3/1996 | Mclaughlin et al. |
| 5,926,178 | A | 7/1999 | Kurtenbach |
| 7,644,372 | B2 | 1/2010 | Russo |
| 7,712,049 | B2 | 5/2010 | Williams et al. |
| 7,941,765 | B2 | 5/2011 | Fleck et al. |
| 8,166,044 | B2 | 4/2012 | Vignoli et al. |
| 8,219,930 | B2 | 7/2012 | Johns |

(Continued)

FOREIGN PATENT DOCUMENTS

WO    2019111067 A1    6/2019

OTHER PUBLICATIONS

Khoury, R. E. (Jul. 20, 2017) PSA: Google Calendar added a drag-and-drop gesture for moving events to different times and days. Android Police. https://www.androidpolice.com/2017/07/20/psa-google-calendar-added-drag-drop-gesture-moving-events-different-times-days/ (Year: 2017).*

(Continued)

*Primary Examiner* — Daniel Samwel
*Assistant Examiner* — David Tan
(74) *Attorney, Agent, or Firm* — Fredrikson & Byron, P.A.

(57) ABSTRACT

A computing device is described that outputs a radial interface. The computing device accesses a list that includes multiple time-based events that have a particular duration. The computing device selects, based on the list and the duration of each time-based event, a subset of time-based events determined such that a sum of the durations for each event in the subset is less than or equal to an hour. An order of the events in the subset is the same as in the list. The computing device generates a graphical user interface that includes a graphical selector and a number of graphical representations equal to the number of events in the subset, each graphical representation corresponding to a different event from the subset, arranged around the selector, and having a size proportional to the duration of the event corresponding to the respective representation. The computing device outputs, for display, the interface.

28 Claims, 13 Drawing Sheets

(56) References Cited

U.S. PATENT DOCUMENTS

| | | | |
|---|---|---|---|
| 8,707,211 B2 | 4/2014 | Yasui et al. | |
| 8,719,730 B2 | 5/2014 | Ganetakos et al. | |
| 9,274,505 B2 | 3/2016 | Johns et al. | |
| 9,383,897 B2 | 7/2016 | Cragun et al. | |
| 9,436,380 B2 | 9/2016 | Chmielewski et al. | |
| 9,733,796 B2 | 8/2017 | Warner | |
| 2005/0044509 A1 | 2/2005 | Hunleth et al. | |
| 2005/0060667 A1 | 3/2005 | Robbins | |
| 2007/0060205 A1 | 3/2007 | Kim | |
| 2009/0255153 A1* | 10/2009 | Mori | G09D 3/12 40/107 |
| 2010/0162170 A1* | 6/2010 | Johns | G04G 9/06 715/834 |
| 2011/0193878 A1* | 8/2011 | Seo | G06F 1/14 345/619 |
| 2013/0298037 A1* | 11/2013 | Matthews, III | H04W 12/0608 715/753 |
| 2014/0358267 A1* | 12/2014 | Littlejohn | H04H 60/06 700/94 |
| 2015/0172438 A1* | 6/2015 | Yang | G06F 1/163 455/419 |
| 2015/0205511 A1 | 7/2015 | Vinna et al. | |
| 2015/0378320 A1* | 12/2015 | Knight | G04G 13/026 368/107 |
| 2020/0028812 A1* | 1/2020 | McBeath | H04M 1/72566 |

OTHER PUBLICATIONS

Goldenson, "Beat Browser," Submitted to the Program in Media Arts and Sciences School of Architecture and Planning, Princeton University, Jul. 2007, 55 pages.

* cited by examiner

INTERFACE FOR RADIAL SELECTION OF TIME-BASED EVENTS

TECHNICAL FIELD

The disclosure relates to graphical user interfaces for navigating time-based elements.

BACKGROUND

Graphical user interfaces in many modern computing devices are forced to straddle the line between being simple enough that a user can easily navigate through the application outputting the graphical user interface and so that the user is not overwhelmed with information, but also must be complex enough to convey all of the information that the user would like to see within the application. When it comes to time-based events, which can be defined as any media- or calendar-based item that is somehow associated with time (e.g., by either occurring at a particular time or by having a particular duration), many graphical user interfaces fail to satisfy the above criteria, either being too difficult to navigate, showing too much information, or showing too little information.

SUMMARY

In general, the disclosure is directed to a graphical user interface output by a computing device that effectively displays a number of time-based events. The graphical user interface includes a radial selector element that points towards an event that is currently occurring. For instance, the radial selector element may point towards a song that is currently playing or a calendar event that is currently occurring. Surrounding the radial selector element are graphical representations of other time-based events, such as additional songs in a playlist or other calendar events for the user of the computing device. Additionally, a size of the graphical representations in the display are output such that the size is proportionate to a duration of the associated time-based event, meaning that a 3-minute event may appear to be half the size of a 6-minute event. In this manner, the size may refer to the area taken up by the graphical representation in the graphical user interface, the length of an internal arc near the radial selector, or any other component of the graphical representation.

The user may interact with the radial selector element to scroll through the graphical representations output in the graphical user interface, either to interact with the other elements or to merely see information about the other time-based events. As the user scrolls through the radial arrangement of the elements, some of these elements may be replaced with additional elements in the list while the device updates the interface to include some number of elements falling within a particular time span before and/or after the current selected by the radial selector during the scrolling input. In this way, the device works through the elements in the list from front to back while maintaining the radial arrangement.

The radial selector element may be directed in a static direction when not being interacted with (e.g., with the time-based events circling around the radial selector element). In other instances, the radial selector element may move in a circle, pointing at the different elements. For example, the radial selector element may be a minute hand of an analog watch face. In these examples, the graphical user interface may include the graphical representations at positions around the analog watch face in locations corresponding to when the time-based events are to occur.

These techniques provide multiple benefits over conventional interfaces. For instance, with time-based events having some known duration, but a dynamic start time based on prior events (e.g., a song within a playlist, a podcast within a podcast list, a video within a video sequence, etc.), it may be difficult to recognize when a particular time-based event is going to occur in the scope of the entire playlist when the events are viewed in a list form. By providing the visual indication in accordance with the techniques described herein, a user may more quickly ascertain the entire landscape of the various time-based events in the list rather than having to scroll vertically through a list and perform mental mathematics. The user interface as described herein also provides an intuitive way to scroll through the time-based events, enabling the graphical user interface to maintain the same beneficial form while the user navigates the list. This may reduce the overall number of user inputs received by the computing device, thereby increasing the durability of the components, the processing efficiency of the device, and the power consumption efficiency of the device, thereby providing the practical application of improving the functioning of the computer. Further, the particular graphical user interface described herein provides an improvement to the technology in which the techniques are implemented by improving the computing device in the manner described above and by providing an improved graphical user interface.

In one example, the disclosure is directed to a method that includes accessing, by one or more processors of a computing device, a list that includes a plurality of time-based events, wherein each time-based event has a particular duration. The method further includes selecting, by the one or more processors, and based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, and wherein an order of the time-based events in the subset of time-based events is a same order as an order in the list. The method also includes generating, by the one or more processors, a graphical user interface that includes a graphical selector and a number of graphical representations equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector. The method further includes outputting, by the one or more processors and for display on a display component, the graphical user interface.

In another example, the disclosure is directed to a computing device that includes a memory configured to store one or more computer-readable instructions. The computing device also includes a processor configured to execute the one or more computer-readable instructions to access a list that includes a plurality of time-based events, wherein each time-based event has a particular duration. The processor is further configured to execute the one or more computer-readable instructions to select, based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, and wherein an order of the time-based events in the subset of time-based events is a same order as an order in the list. The processor is also configured to execute the one or more computer-readable instructions to generate a graphical user interface that includes a graphical selector and a number of graphical representations equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector. The processor is further configured to execute the one or more computer-readable instructions to output, for display on a display component, the graphical user interface.

In another example, the disclosure is directed to a non-transitory computer-readable storage medium containing instructions. The instructions, when executed, cause one or more processors to access a list that includes a plurality of time-based events, wherein each time-based event has a particular duration. The instructions, when executed, further cause one or more processors to select, based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, and wherein an order of the time-based events in the subset of time-based events is a same order as an order in the list. The instructions, when executed, also cause one or more processors to generate a graphical user interface that includes a graphical selector and a number of graphical representations equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector. The instructions, when executed, further cause one or more processors to output, for display on a display component, the graphical user interface.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
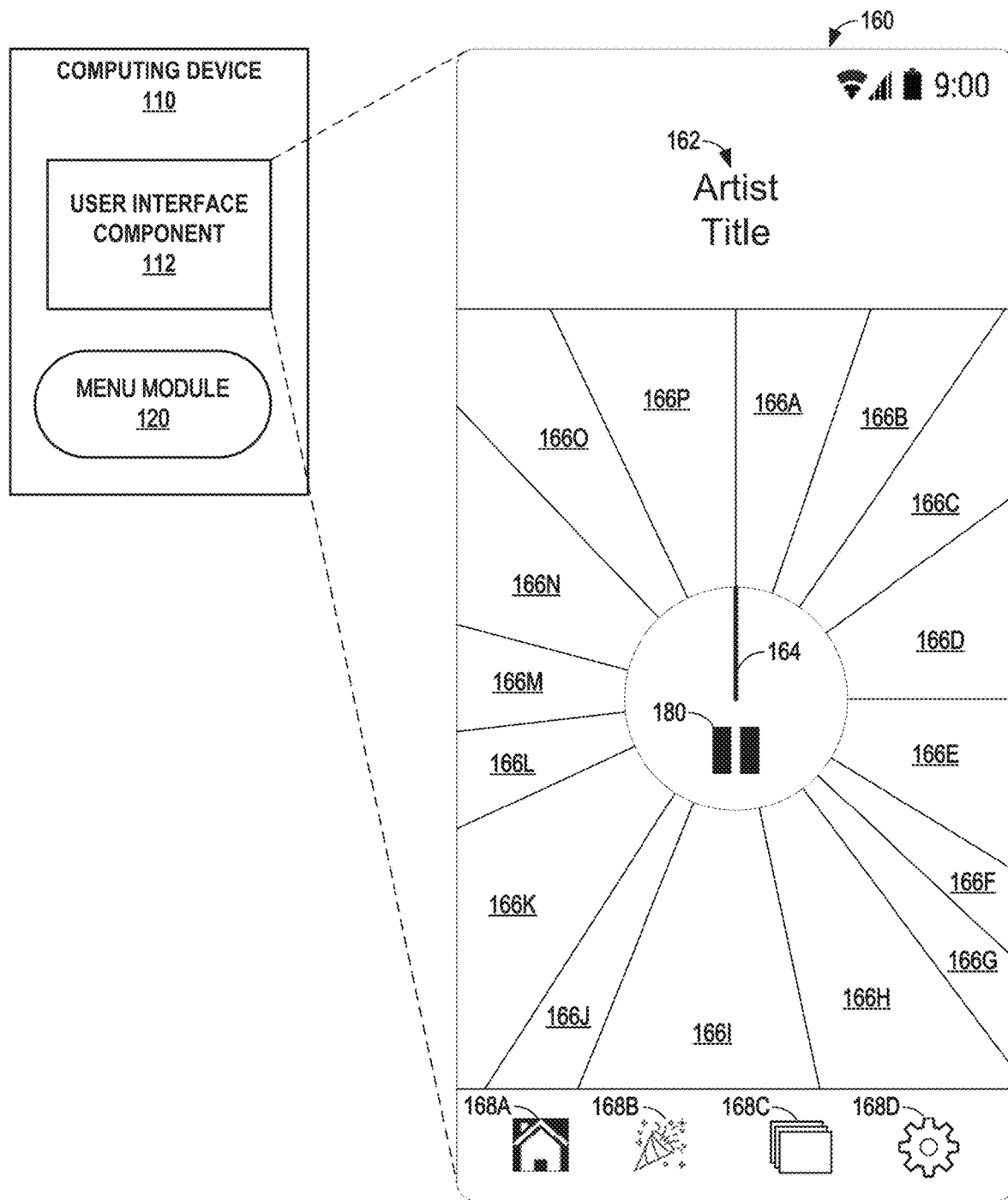
FIG. 1 is a conceptual diagram illustrating a computing device configured to output an example radial selection interface, in accordance with one or more of the techniques described herein.

FIG. 1 is a conceptual diagram illustrating computing device 110 configured to output an example radial selection interface 160, in accordance with one or more of the techniques described herein. Computing device 110 may include at least user interface (UI) component 112, and menu module 120. Computing device 110 may be any of a smartphone, a tablet, a laptop, a desktop, a smartwatch, a smart refrigerator, a smart appliance, a musical instrument, a server device, or a cloud device, among other things.

UI component 112 of computing device 110 may perform various functions, including display functions and presence-sensitive input functions. UI component 112 may be a screen at which information (e.g., a visual indication) is displayed by UI component 112, while UI component 112 may also detect an object at and/or near UI component 112.

While illustrated as an internal component of computing device 110, UI component 112 may also represent an external component that shares a data path with computing device 110 for transmitting and/or receiving input and output. For instance, in one example, UI component 112 represents a built-in component of computing device 110 located within and physically connected to the external packaging of computing device 110 (e.g., a screen on a mobile phone or a smartwatch). In another example, UI component 112 represents an external component of computing device 110 located outside and physically separated from the packaging or housing of computing device 110 (e.g., a monitor, a projector, etc. that shares a wired and/or wireless data path with computing device 110).

UI component 112 of computing device 110 may detect two-dimensional and/or three-dimensional gestures as input from a user of computing device 110. For instance, a sensor of UI component 112 may detect a user's movement (e.g., moving a hand, an arm, a pen, a stylus, a tactile object, etc.) within a threshold distance of the sensor of UI component 112. UI component 112 may determine a two or three-dimensional vector representation of the movement and correlate the vector representation to a gesture input (e.g., a hand-wave, a pinch, a clap, a pen stroke, etc.) that has multiple dimensions. In other words, UI component 112 can detect a multi-dimension gesture without requiring the user to gesture at or near a screen or surface at which UI component 112 outputs information for display. Instead, UI component 112 can detect a multi-dimensional gesture performed at or near a sensor which may or may not be located near the screen or surface at which UI component 112 outputs information for display.

Menu module 120 may be operable by one or more processors of computing device 110 to perform various actions, operations, or functions of computing device 110. For example, the processors of computing device 110 may retrieve and execute instructions stored by menu module 120 that cause the processors to perform the operations described with respect to menu module 120. The instructions, when executed by the processors, may cause computing device 110 to generate, output, and manipulate a radial selection interface for time-based elements where the size of the elements is dependent on a duration of the respective element.

In accordance with the techniques described herein, menu module 120 may access a list that includes a plurality of time-based events. Each time-based event may have a particular duration. For instance, the time-based events may include any of, or any mix of, a song, a podcast, a video, a picture in a slide of a slideshow, a calendar event, an appointment, an audio book, an audio recording, a planned refrain from audio or video, or an access priority (e.g., a next customer in a queue for an at-home service, a customer's place in a line, such as in an amusement park, or any other queue-based activity). The list may be an ordered list, such as a specific sequence of the time-based events to occur consecutively. While the list may be a pre-defined ordered list stored on computing device 110, the list may not necessarily be stored statically by computing device 110. Rather, the list may be compiled dynamically when computing device 110 executes menu module 120. For instance, the list may include a number of songs, such as in playlist form, but may be generated in a new order if the user activates a "shuffle" feature for the songs within the playlist. In general, the list is merely any grouping of the various time-based events in some order.

Menu module 120 may select, based at least in part on the list and the duration of each time-based event, a subset of time-based events from the plurality of time-based events. Menu module 120 may determine the subset of time-based events from the plurality of time-based events is determined such that a sum of the durations for each respective time-based event in the subset of time-based events is less than or equal to an hour. However, in other examples, menu module 120 may select the subsets using any other amount of time as the total duration limit, such as 30 minutes, 2 hours, 3 hours, 4 hours, 6 hours, 12 hours, 16 hours, or 24 hours, among other time limits. Furthermore, when menu module 120 selects the subset of time-based events, an order of the time-based events in the subset of time-based events may be a same order as an order in the list.

Menu module 120 may then generate graphical user interface 160 that includes graphical selector 164 and a number of graphical representations 166A-166P (collectively, graphical representations 166). The number of graphical representations 166 may be equal to the number of time-based events in the subset of time-based events, such that graphical interface 160 includes a graphical representation 166 of every time-based event in the subset. Each graphical representation 166 corresponds to a different time-based event from the subset of time-based events. Further, a size of each graphical representation 166, such as an area of each of graphical representations 166 or a length of the interior arc of each of graphical representations 166, is proportional to the duration of the time-based event corresponding to the respective graphical representation 166. As shown in graphical interface 160, graphical representations 166 are arranged at least partially around graphical selector 160. Menu module 120 then outputs graphical user interface 160 for display on UI component 112.

Graphical representations 166 may also vary in the form of the information that is shown. For instance, initially, each of graphical representations 166 may show cover art for the respective song that is associated with the graphical representations. If menu module 120 detects an indication of user input, such as a tap input, at one of graphical representations 166, such as graphical representation 166J, menu module 120 may alter the visual characteristics of graphical representation 166J to instead show descriptive text instead of the cover art. Furthermore, if two graphical representations, such as graphical representation 166C and graphical representation 166D, are two songs from the same album, menu module 120 may generate graphical user interface 160 to still include the line between graphical representations 166C and 166D, but also such that the cover art of graphical representation 166D is an extension of the cover art of graphical representation 166C.

In some instances, menu module 120 may generate graphical user interface 160 to include additional elements. For instance, in the example of FIG. 1, menu module 120 may generate information 162, the information being descriptive of the currently selected time-based event (e.g., the time-based event corresponding to graphical representation 166A). Additionally, menu module 120 may generate icons 168A-168D to access additional functionality in an application that utilizes the techniques described herein. In instances where the time-based events are some sort of media, menu module 120 may also generate a dynamic play/pause icon 180 that indicates whether the next interaction with dynamic play/pause icon 180 would pause the media or play the media.

Menu module 120 may also generate each of graphical representations 166 to show various information. For instance, menu module 120 may generate each of graphical representations 166 such that a user may visualize the time-based event represented by the respective graphical representation 166 in some way. This information could include album art of the song or podcast represented by the respective graphical representation 166, a title page of a video represented by the respective graphical representation 166, an artist name for a song represented by the respective graphical representation 166, a podcast host for a podcast represented by the respective graphical representation 166, a song, video, or podcast title for the media represented by the respective graphical representation 166, a color classification for an event represented by the respective graphical representation 166, cover art for an audio book or portion of an audio book represented by the respective graphical representation 166, an indication of a planned audio/video refrain represented by the respective graphical representation 166, a name or address of the customer having the access priority represented by the respective graphical representation 166, or any other information that could give the user some indication of what time-based event is represented by the respective graphical representation 166.

These techniques provide multiple benefits over conventional interfaces. For instance, with time-based events having some known duration, but a dynamic start time based on prior events (e.g., a song within a playlist, a podcast within a podcast list, a video within a video sequence, etc.), it may be difficult to recognize when a particular time-based event is going to occur in the scope of the entire playlist when the events are viewed in a list form. By providing graphical representations 166 in accordance with the techniques described herein, a user may more quickly ascertain the entire landscape of the various time-based events in the list rather than having to scroll vertically through a list and perform mental mathematics. The user interface as described herein also provides an intuitive way to scroll through the time-based events, enabling graphical user interface 160 to maintain the same beneficial form while the user navigates the list. This may reduce the overall number of user inputs received by computing device 110, thereby increasing the durability of the components, the processing efficiency of computing device 110, and the power consumption efficiency of computing device 110, thereby providing the practical application of improving the functioning of computing device 110. Further, graphical user interface 160 described herein provides an improvement to the technology in which the techniques are implemented by improving computing device 110 in the manner described above and by providing an improved graphical user interface.

Figure 2:
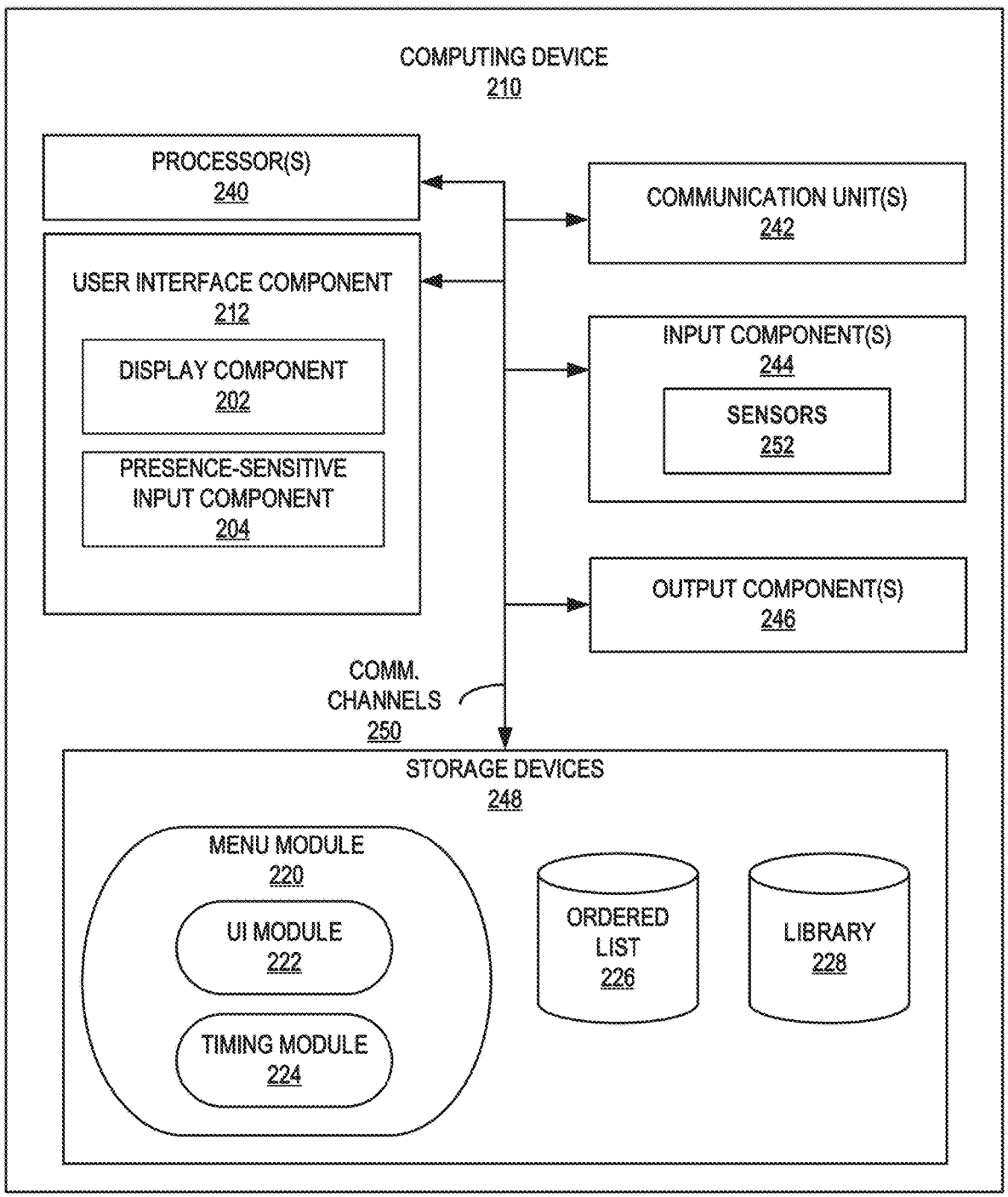
FIG. 2 is a block diagram illustrating a more detailed example of a computing device configured to perform the techniques described herein.

FIG. 2 is a block diagram illustrating an example computing device configured to output a radial selection interface, in accordance with one or more aspects of the techniques described in this disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2. Computing device 210 may be any of a smartphone, a tablet, a laptop, a desktop, a smartwatch, a smart refrigerator, a smart appliance, a musical instrument, a server device, or a cloud device, among other things.

As shown in the example of FIG. 2, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include menu module 220, ordered list data 226, and library 228. Menu module 220 further includes user interface (UI) module 222 and timing module 224.

One or more processors 240 may implement functionality and/or execute instructions associated with computing device 210 to dynamically expand an interface element associated with application 218 displayed on UIC 212 of computing device 210. That is, processors 240 may implement functionality and/or execute instructions associated with computing device 210 to generate and manipulate a user interface with a radial selection element for time-based events, in accordance with the techniques described herein.

Examples of processors 240 include application processors, display controllers, auxiliary processors, one or more sensor hubs, and any other hardware configured to function as a processor, a processing unit, or a processing device. Modules 220, 222, and 224 may be operable by processors 240 to perform various actions, operations, or functions of computing device 210. For example, processors 240 of computing device 210 may retrieve and execute instructions stored by storage components 248 that cause processors 240 to perform the operations described with respect to modules 220, 222, and 224. The instructions, when executed by processors 240, may cause computing device 210 to generate, output, and manipulate a radial selection interface for time-based elements where the size of the elements is dependent on a duration of the respective element.

Menu module 220 may include all functionality of menu module 120 of computing device 110 of FIG. 1. Furthermore, menu module 220 may include additional modules, such as UI module 220 and timing module 224, that may perform similar operations as menu module 120 for managing a user interface (e.g., user interface 160) that computing device 210 provides at UIC 212 for example, for facilitating interactions between a user of computing device 110 and the radial selection interface. For example, timing module 224 of computing device 210 may receive information from ordered list data store 226 that includes various time-based elements, determine durations of the various events, and UI module 222 may generate the user interface from that data.

One or more storage components 248 within computing device 210 may store information for processing during operation of computing device 210 (e.g., computing device 210 may store data accessed by modules 220, 222, and 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, and 224 and data stores 226 and 228. Storage components 248 may include a memory configured to store data or other information associated with modules 220, 222, and 224 and data stores 226 and 228.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components 252 one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, sound card, video graphics adapter card, speaker, cathode ray tube (CRT) monitor, liquid crystal display (LCD), light emitting diode (LED) display, or any other type of device for generating output to a human or machine in a selected modality.

UI component 212 of computing device 210 may be similar to UI component 112 of computing device 110 and includes display component 202 and presence-sensitive input component 204. Display component 202 may be a screen at which information (e.g., a visual indication) is displayed by UI component 212 while presence-sensitive input component 204 may detect an object at and/or near display component 202.

While illustrated as an internal component of computing device 210, UI component 212 may also represent an external component that shares a data path with computing device 210 for transmitting and/or receiving input and output. For instance, in one example, UI component 212 represents a built-in component of computing device 210 located within and physically connected to the external packaging of computing device 210 (e.g., a screen on a mobile phone or a smartwatch). In another example, UI component 212 represents an external component of computing device 210 located outside and physically separated from the packaging or housing of computing device 210 (e.g., a monitor, a projector, etc. that shares a wired and/or wireless data path with computing device 210).

UI component 212 of computing device 210 may detect two-dimensional and/or three-dimensional gestures as input from a user of computing device 210. For instance, a sensor of UI component 212 may detect a user's movement (e.g., moving a hand, an arm, a pen, a stylus, a tactile object, etc.) within a threshold distance of the sensor of UI component 212. UI component 212 may determine a two or three-dimensional vector representation of the movement and correlate the vector representation to a gesture input (e.g., a hand-wave, a pinch, a clap, a pen stroke, etc.) that has multiple dimensions. In other words, UI component 212 can detect a multi-dimension gesture without requiring the user to gesture at or near a screen or surface at which UI component 212 outputs information for display. Instead, UI component 212 can detect a multi-dimensional gesture performed at or near a sensor which may or may not be located near the screen or surface at which UI component 212 outputs information for display.

In accordance with the techniques of this disclosure, timing module 224 may access list 226 that includes a plurality of time-based events. Each time-based event has a particular duration, such as a song, a podcast, a video, a picture in a slide of a slideshow, a calendar event, an appointment, an audio book, an audio recording, a planned refrain from audio or video, or an access priority, among other things. Given the nature of the time-based events, list 226 may be any sequence of the time-based events, potentially occurring consecutively if the time-based events are not statically connected to particular times. List 226 may include the time-based events in and of itself, or list 226 may include pointers that direct timing module 224 to instances of the time-based events in library 228.

Timing module 224 may select, based at least in part on list 226 and the duration of each time-based event in list 226, a subset of time-based events from the plurality of time-based events in list 226. Timing module 224 may select the subset of time-based events from the plurality of time-based events such that a sum of the durations for each respective time-based event in the subset of time-based events is less than or equal to an hour. However, in other examples, menu module 120 may select the subsets using any other amount of time as the total duration limit, such as 30 minutes, 2 hours, 3 hours, 4 hours, 6 hours, 12 hours, 16 hours, or 24 hours, among other time limits. An order of the time-based events in the subset of time-based events may be a same order as an order in the list.

After timing module 224 generates the subset of time-based events from list 226, UI module 222 may generate a graphical user interface (e.g., graphical user interface 160) that includes a graphical selector and a number of graphical representations equal to the number of time-based events in the subset of time based events. Each graphical representation corresponds to a different one of the time-based events from the subset of time-based events. When generating the graphical user interface, UI module 222 may size each graphical representation to be proportional, or at least correlative, to the duration of the time-based event corresponding to the respective graphical representation. In other words, a larger graphical representation will be associated with a time-based event that has a longer duration. In instances where the size is proportional to the duration, the portion of the graphical representation that may be proportional may be one of an area of the graphical representation or a length of one side of the graphical representation, such as an arc along an interior circle of the graphical user interface, as the graphical representations may be arranged at least partially around the graphical selector. UI module 222 may then output, for display on UI component 212, the graphical user interface.

While there may be a limit on the total time duration of the items in the subset, it may not be the case that sequential time-based events in list 226 add up to exactly the time duration limit defined above. In such a case, the subset of time-based events includes a portion of a first time-based event, the first time-based event being the final time-based event in the subset (e.g., the time-based event occurring at the latest time out of all of the time-based events in the subset). The portion of the first time-based event may be such that the sum of the durations for each respective time-based event fully included in the subset of time-based events and the duration of the portion of the first time-based event is equal to the hour. For instance, if a number of time-based events add up to 58 minutes and 30 seconds, but the next time-based event in the order of list 226 is three minutes and 30 seconds long, timing module 224 may treat that next time-based event as only one minute and 30 seconds long such that the subset adds up to a total of an hour. As time passes and portions of a current time-based event are passed (e.g., as a song is playing from the playlist), timing module may remove items at the front end of the subset and add in additional portions of the truncated time-based event such until that time-based event is fully included in the subset.

In some instances, UI module 222 may further match the graphical representations to an expected time that the time-based event is to occur, generating the graphical representations to be output along the outside of an analog clock face at a location that matches the expected time. In other words, timing module 224 may determine a current time. The graphical selector may be a minute hand of an analog clock, with the analog clock showing the current time in the graphical user interface. Each of the graphical representations are sized and arranged such that the graphical selector points towards the graphical representation when the respective time-based event associated with the graphical representation is to occur. For instance, if a user presses play on a podcast playlist at a certain time, the graphical representations may be output such that the graphical representation associated with the currently playing podcast begins at the certain time and ends at the time the podcast would end, and the graphical representation associated with the next podcast in the podcast playlist would begin at the point the previous graphical representation ends.

In such an instance where the graphical representations line up with the time, the subset of time-based events may be chosen to fit a certain time frame. For instance, the subset of time-based events may include each time-based event scheduled to occur within 45 minutes of the current time and each time-based event that occurred within the 15 minutes prior to the current time (e.g., the songs in a playlist that were played in the most recent 15 minutes, along with the songs that will play in the next 45 minutes). In other instances, the subset of time-based events may include each time-based event scheduled to occur within 30 minutes of the current time and each time-based event that occurred within the 30 minutes prior to the current time (e.g., the songs in a playlist that were played in the most recent 30 minutes, along with the songs that will play in the next 30 minutes). In other instances, the subset of time-based events include each time-based event scheduled to occur within 60 minutes of the current time (e.g., only the songs in the playlist that will play in the next hour of time, with songs or portions of songs that are complete being removed from the subset as they are passed). In still other instances, the subset of time-based events include each time-based event scheduled to occur during the hour of the current time (e.g., for the 5:00 hour, every song projected to be played will be included in the subset, and at the 6:00 hour, the subset will be replenished with the songs projected to be played in that hour).

In other instances, rather than showing the time, the radial selector may initially be positioned in a static direction. In such instances, rather than the graphical representations being shown on the screen as the minute hand travels around the clock face, the graphical representations cycle around the graphical selector as time passes.

Timing module 224 and UI module 222 may continue updating the graphical user interface such that the graphical user interface always shows the time-based events occurring within a particular timeframe. Modules 222 and 224 may do this by, on a minute-by-minute basis or a second-by-second basis, or by any other denomination of time, removing portions of previous graphical representations representing a passed time-based event and replacing those with portions of other graphical representations for upcoming time-based events. For instance, in examples where the full next hour of songs are displayed in the interface, as seconds tick by in the song currently playing, the portion of the graphical representation associated with the parts of the song that have already passed may be replaced by UI module 222 with portions of a graphical representation for a song that will be played an hour from the current time. In other instances, UI module 222 may update the graphical user interface to include a future time-based event from list 226 in place of a passed time-based event from list 226 at the conclusion of the passed time-based event. In other words, at the conclusion of a currently playing song, the graphical representation associated with that song may be completely removed and replaced with one or more graphical representations of upcoming songs in the playlist.

The graphical selector may include a first endpoint fixed in the graphical user interface. The first endpoint may be an endpoint of the graphical selector farthest away from the graphical representations of the time-based events. For instance, when the graphical representations are placed around a graphical selector, such as in a circle around the radial selector, the center of that interior circle may be the fixed endpoint, with the radial selector rotating around that fixed endpoint. In such instances, the graphical selector is at a first angular position in the graphical user interface. UI module 222 may then receive an indication of user input at a portion of the graphical user interface corresponding to the graphical selector. The indication of user input may be a radial gesture moving the graphical selector around the first endpoint in the graphical user interface. UI module 222 may then detect that the indication of user input is no longer being received and output a subsequent graphical user interface with the graphical selector at the first angular position. In other words, UI module 222 may detect user input at the graphical selector that moves the graphical selector around in a circular motion, potentially such that the graphical selector is pointing towards a different graphical representation. When the user input is released, the graphical selector may return to the previous position. The first angular position may be one of a static direction or a representation of an amount of minutes in a current time (e.g., the minute hand of the current time represented by an analog clock face).

In some such instances, UI module 222 may detect that a graphical representation of a first time-based event is in the direction that the graphical selector is pointing towards upon the detection of the indication of user input no longer being received. UI module 222 may then select the first time-based event and perform an action using the first time-based event. One such action could be moving a position of the first time-based event within list 226 such that the first time-based event is inserted in place of a current time-based event selected by the graphical selector when the graphical selector is in the first position and updating the graphical user interface to reflect the updated list. An example of such an action would be stopping the playback of a particular song in favor of playing the selected song immediately.

Another example action could be moving the position of the first time-based event within list 226 such that the first time-based event is inserted immediately after a current time-based event selected by the graphical selector when the graphical selector is in the first position and updating the graphical user interface to reflect the updated list. An example of such an action would include taking the selected song and putting it in a "next" position for once the currently playing song has completed.

Another such action could be skipping every time-based event between the current time-based event and the first time-based event in list 226, jumping forward or backward to that spot. In such an instance, UI module 222 and timing module 224 may regenerate the entire graphical user interface by selecting, based at least in part on the list and the duration of each time-based event, a second subset of time-based events from the plurality of time-based events beginning with the first time-based event. Timing module 224 may determine the second subset of time-based events from the plurality of time-based events such that a sum of the durations for each respective time-based event in the second subset of time-based events is less than or equal to an hour, and such that an order of the time-based events in the second subset of time-based events is a same order as the order in the list. UI module 222 may then update the graphical user interface to reflect the second subset of time-based event.

When the user is scrolling through list 226 in the manner described above, the user may not wish to be limited to only the subset of time-based events currently shown through graphical representations on the screen. As such, while receiving the indication of user input, UI module 222 may update, based on a current angular position of the graphical selector during the user input, the graphical user interface such that the graphical user interface displays the graphical representation for each time-based event in the plurality of time-based events that occur within a first amount of time after the time indicated by the current angular position and the graphical representation for each time-based event in the plurality of time-based events that occur within a second amount of time prior to the time indicated by the current angular position. For instance, when the interface resembles an analog clock face and the user is moving the minute hand, UI module 222 may continuously update the user interface such that a certain amount of time in the future and a certain amount of time in the past is represented as the user moves the minute hand around the clock face to change the time. UI module 222 may update the list such that the next 45 minutes and previous 15 minutes of time-based events relative to the current time indicated by the graphical selector is shown in the graphical user interface, such that the next 30 minutes and previous 30 minutes of time-based events relative to the current time indicated by the graphical selector is shown in the graphical user interface, such that the next 15 minutes and previous 45 minutes of time-based events relative to the current time indicated by the graphical selector is shown in the graphical user interface, such that the next 60 minutes of time-based events relative to the current time indicated by the graphical selector is shown in the graphical user interface, or such that the current hour's time-based events (i.e., the time-based events in the same hour as the hour hand while the minute hand is moved around the clock face). In other words, the first amount of time and second amount of time may be dynamic amounts of time such that a sum of the first amount of time and second amount of time are equal to 60 minutes and such that the first amount of time is equal to a number of minutes that, when added to a minutes portion of a time indicated by the current angular position, cause the summed minutes to equal 60 minutes.

In some examples, timing module 224 may add a new time-based event to list 226. If timing module 224 determines that, based on the position of the new time-based event within list 226 and based on the previously determined subset of time-based events, whether the new time-based event is set to occur prior to a final time-based event in the subset of time-based events. If the new time-based event is set to occur prior to a final time-based event in the subset of time-based events, timing module 224 may reset the subset and select, based at least in part on the updated list and the duration of each time-based event, a second subset of time-based events from the plurality of time-based events. The second subset of time-based events includes the new time-based event, and timing module 224 determines the second subset of time-based events from the plurality of time-based events such that a sum of the durations for each respective time-based event in the second subset of time-based events is less than or equal to an hour, and such that an order of the time-based events in the second subset of time-based events is a same order as the order in the list. UI module 222 may generate an updated graphical user interface that includes the graphical selector and a number of graphical representations equal to the number of time-based events in the second subset of time based events, with each graphical representation corresponding to a different time-based event from the second subset of time-based events. UI module 222 may generate the graphical representations such that a size of each graphical representation is proportional to the duration of the time-based event corresponding to the respective graphical representation, as previously described. The graphical representations are arranged at least partially around the graphical selector. UI module 222 may then output, for display on UI component 212, the updated graphical user interface.

Timing module 224 may also insert an overlapping transitional effect near a conclusion of the time-based events during playback, such as when the time-based events are some sort of media. The overlapping transitional effect may continue into a beginning portion of a second time-based event immediately following the first time-based event in the subset of time-based events. For instance, timing module 224 may create an overlap of the first time-based event and the second time-based event, a cutting of the first time-based event and the second time-based event, a splicing of the first time-based event and the second time-based event, a fading of the first time-based event into the second time-based event, or a joining of the first time-based event and the second time-based event.

In some instances, the plurality of time-based events in list 226 may be individual events for the user, such as a personal playlist. In other instances, the plurality of time-based events in list 226 are compiled from a group of two or more users, such as in a party setting. In general, a party setting may be a function where multiple users each generate a personal list of time-based events, such as a personal playlist of songs, and a host device compiles each of the personal lists to generate a single compiled list that is shared with each of the secondary devices controlled by other users. The host device may be the only device that actually outputs the time-based events, but each device may be able to view and update the list. This setting would be particularly useful for gatherings were multiple users want to contribute to the musical playback but users do not want to continue switching and pairing different devices to potential playback devices.

For instance, computing device 210 may be considered a host device for the party. Timing module 224 may compile the list by determining an order for the group of two or more users. The order includes one or more indications of each user in the group of two or more users. While there remains indications in the order, timing module 224 may retrieve a next time-based event to be added to the list, the next time-based event being associated with a next user in the order for the group of two or more users, and the next time-based event being a next time-based event on a respective personal list for the next user stored on a secondary computing device associated with a next user in the order. In other words, timing module 224 may determine an order as cycling through the users in the group of two or more users, placing an amount of indications for a particular user in the order equal to a number of time-based events that user has in their personal lists. When a user runs out of items, timing module 224 may refrain from putting additional indications in the order for that user. Once all users have been exhausted, timing module 224 may then begin following the order to extract time-based events from the personal lists to place in the compiled lists.

In another instance, computing device 210 may skip adding the indications to the initial order. In other words, timing module 224 may, while at least one user from the group of two or more uses has a time-based event in a respective personal list that has not been inserted into the list, cycle through each of the group of two or more users and, if a next user in the cycle has a time-based event in a respective personal list that has not been inserted into the list, insert a next time-based event from the respective personal list into list 226.

In some instances, if a same time-based item is included in multiple users' lists, timing module 224 may either skip the repeat instance of the time-based event, opting to select either a new time-based event from the repeater's personal list or skipping the repeater altogether, or add a second instance of the time-based event into the compiled list.

When initially determining the sequence at which the order will be created, timing module 224 may first determine one or more of a total number of time-based events in the respective personal list of each user in the group of two or more users or a total duration of the time-based events in the respective personal list of each user in the group of two or more users. Timing module 224 may place users with longer durations of lists or more items in their list earlier in the sequence.

In other instances, computing device 210 may be a secondary computing device. In such instances, when UI module 222 is accessing list 226, UI module 222 may retrieve list 226 from, and as compiled by, one of a host device or a server in communication with the host device. In some instances when computing device 210 is a secondary device, each graphical representation in the graphical user interface may include an indication of a user from the group of two or more users that inserted the respective time-based event into the list. In some further instances, each graphical representation that is associated with a time-based event that was not inserted into the list by the user of the secondary device does not include indications of the content of the respective time-based event.

As a note, the compilation of the party list is not exclusive to an application that outputs graphical representations of the time-based events in the manner described herein. In general, techniques associated with the compilation of the party list can be applied to any media application and any layout for the graphical user interfaces within said application.

With regards to FIGS. 3-11, the graphical user interfaces are generally shown with the time-based events as audio songs, and the associated description will include similar terminology. However, it is to be understood that any time-based events may be used in accordance with the techniques and description of FIGS. 3-11. For instance, the time-based events may include any of, or any mix of, a song, a podcast, a video, a picture in a slide of a slideshow, a calendar event, an appointment, an audio book, an audio recording, a planned refrain from audio or video, or an access priority (e.g., a next customer in a queue for an at-home service, a customer's place in a line, such as in an amusement park, or any other queue-based activity).

Further, the graphical representations will only, generally, include the reference number in FIGS. 3-11. However, in accordance with the techniques described herein, it should be understood that the computing device that generates these graphical user interfaces may generate each of the graphical representations such that a user may visualize the time-based event represented by the respective graphical representation in some way. This information could include album art of the song or podcast represented by the respective graphical representation, a title page of a video represented by the respective graphical representation, an artist name for a song represented by the respective graphical representation, a podcast host for a podcast represented by the respective graphical representation, a song, video, or podcast title for the media represented by the respective graphical representation, a color classification for an event represented by the respective graphical representation, cover art for an audio book or portion of an audio book represented by the respective graphical representation, an indication of a planned audio/video refrain represented by the respective graphical representation, a name or address of the customer having the access priority represented by the respective graphical representation, or any other information that could give the user some indication of what time-based event is represented by the respective graphical representation.

Figure 3:
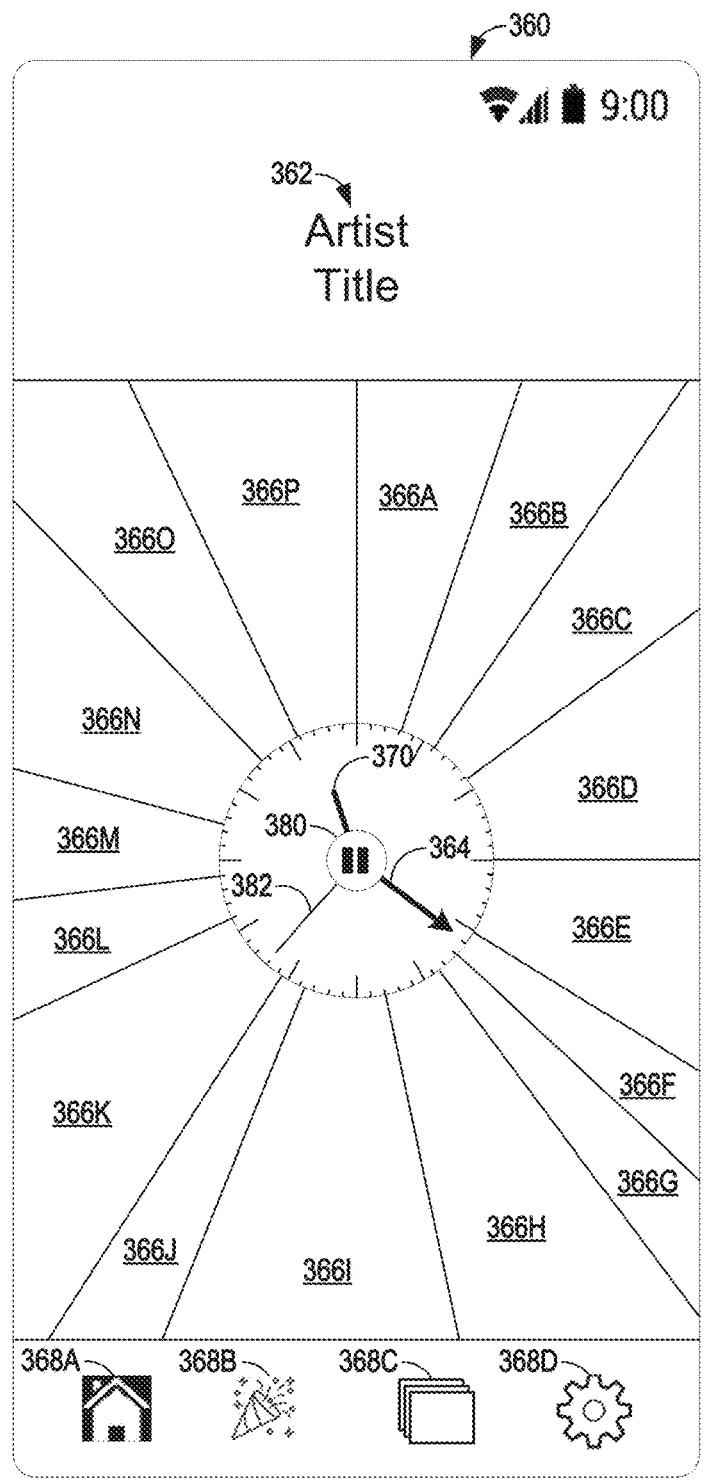
FIG. 3 is an example radial selection interface with an analog watch face, in accordance with one or more of the techniques described herein.

FIG. 3 is an example radial selection user interface 360 with an analog watch face, in accordance with one or more of the techniques described herein. User interface 360 may be output on a UI component of a computing device, such as UI component 212 of computing device 210. User interface 360 includes radial selection element 364 and various event indications 366A-366P (collectively, indications 366). Each of indications 366 is associated with a particular time-based event, each of which has a particular duration. A size of each respective indication 366 (e.g., the length of the inner arc of indication 366) is proportional to the duration of the associated time-based event. User interface 360 includes event information 362, which includes information of a particular one of indications 366 that is currently playing or selected by radial selection element 364 (i.e., indication 366F). User interface 360 also includes icons 368A-368D (collectively, icons 368). Each of icons 368 may present a different interface within the application when selected.

As shown in FIG. 3, radial selection element 364 is the minute hand of an analog watch face that also includes hour hand 370. In this example, each of graphical indications 366A-366P are output in a location associated with the time the associated time-based event would occur if the computing device continued playing the time-based events with the current settings. For instance, at the time of 11:21, the computing device may execute time-based event 366F. Similarly, as the computing device continues to play or execute the time-based events, at time 11:30, the computing device would play time-based event 366I. Radial selection element 364 may also include an arrow to more precisely indicate which of graphical representations 366 radial selection element 364 is currently pointing towards.

Further, as shown in FIG. 3, graphical user interface 360 may include second hand 382 in the analog watch face. In addition to showing an additional level of precision in displaying the time within graphical user interface 360, second hand 382 may provide an additional level of precision for navigation within graphical user interface 360. For instance, second hand 382 may be used as a fast forward/rewind element. In some examples, the computing device may receive an indication of user input at second hand 382. The user input may consist of a radial swipe, moving second hand 382 forwards or backwards some amount of angular distance. For instance, if the user input moves second hand 382 backwards (i.e., counter clockwise) an angular distance that is equivalent of 20 seconds, the computing device may rewind the currently playing song 20 seconds, snapping second hand 382 back to the current time and moving graphical representations 366 around the analog watch face accordingly. Similarly, if the user input moves second hand 382 forwards (i.e., clockwise) an angular distance that is equivalent of 15 seconds, the computing device may fast forward the currently playing song 15 seconds, snapping second hand 382 back to the current time and moving graphical representations 366 around the analog watch face accordingly.

While second hand 382 is described herein as relating to "seconds", in other instances, including those where the length of time represented by the circle of time-based events is not equal to an hour, the fast forward/rewind capabilities and precision movement techniques described above with respect to second hand 382 may be used for time increments other than seconds. For instance, if used in a scientific setting where the time-based events are scientific events, such as schedules of when to add ingredients to a chemical blend, schedules of when to affect the biology of a specimen, or when to execute a method call or alter a variable in computer code, second hand 382 may correspond to millisecond adjustments, microsecond adjustments, nanosecond adjustments, or any other adjustment that is adequate for such time-based events. As such, second hand 382 may act as a precision hand as opposed to strictly a clock hand that tracks only seconds.

In the example of FIG. 3, graphical user interface 360 includes the dynamic play/pause indication 380 on the watch face in the center of the watch face, such that radial selection element 364, hour hand 370, and second hand 382 appear to extend outward from dynamic play/pause indication 380.

Figure 4:
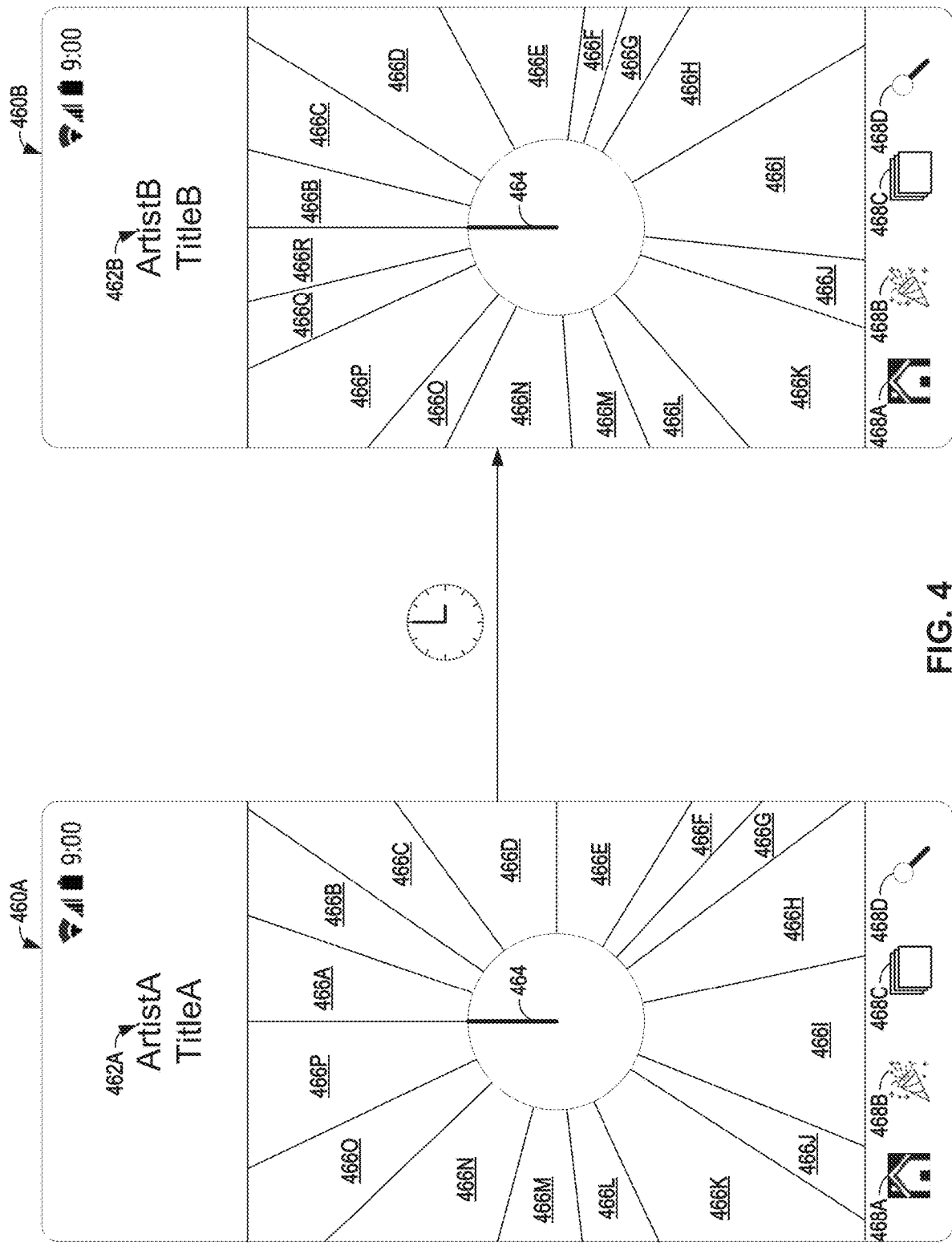
FIG. 4 is an example radial selection interface with an illustration of the time-based events moving around the radial selector as time passes, in accordance with one or more of the techniques described herein.

FIG. 4 is an example radial selection user interfaces 460A-460B with an illustration of the time-based events moving around the radial selector as time passes, in accordance with one or more of the techniques described herein. User interfaces 460A and 460B may be output on a UI component of a computing device, such as UI component 212 of computing device 210. User interfaces 460A and 460B include radial selection element 464 and various event indications 466A-466R (collectively, indications 466). Each of indications 466 is associated with a particular time-based event, each of which has a particular duration. A size of each respective indication 466 (e.g., the length of the inner arc of indication 466) is proportional to the duration of the associated time-based event. User interfaces 460A and 460B include event information 462A and 462B, respectively, which include information of a particular one of indications 466 that is currently playing or selected by radial selection element 464 (i.e., indication 466A and 466B, respectively). User interfaces 460A and 460B also include icons 468A-468D (collectively, icons 468). Each of icons 468 may present a different interface within the application when selected.

In the example of FIG. 4, graphical user interface 460A shows an initial layout of songs as the initial subset is generated. This subset initially includes the time-based events associated with graphical representations 466A-466P.

Over time, the song associated with graphical representation 466A has played and completed. As such, in graphical user interface 460B, graphical representation 466A has been removed from the playlist. Given the length of the song associated with graphical representation 466A, there may be two additional songs (associated with graphical representations 466Q and 466R) that replace the played song in the subset. As the song associated with 466B starts playing on the computing device, graphical user interface 460B has replaced graphical user interface 460A. During that replacement, the computing device updates the subset to include the two new songs, and regenerates the graphical user interface, or generates graphical user interface 460B, using the updated subset and the updated positions of each of the items within the subset and the list.

Figure 5:
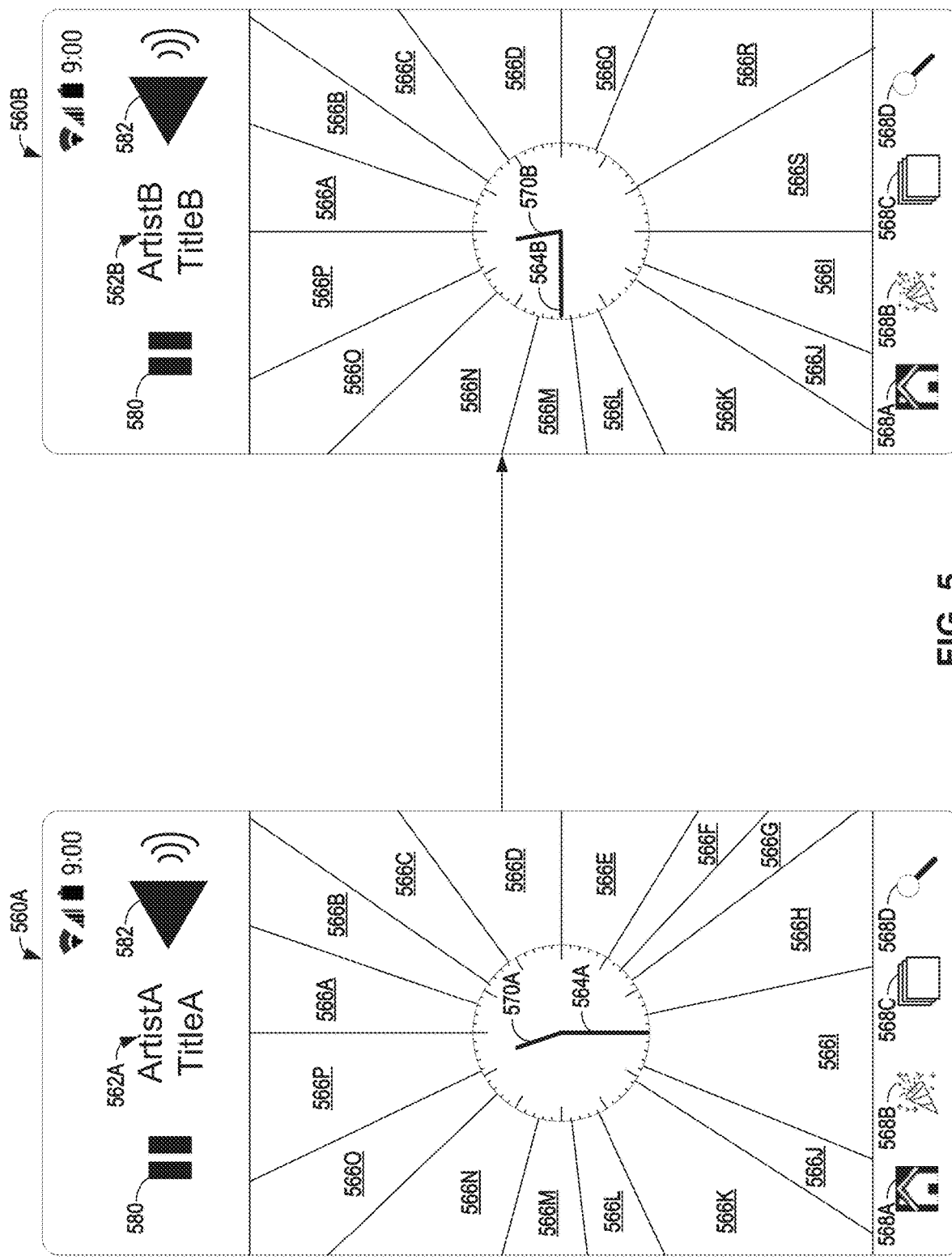
FIG. 5 is an example radial selection interface with an analog watch face and an illustration of the time-based events staying stationary, but updating, around the radial selector as time passes, in accordance with one or more of the techniques described herein.

FIG. 5 is an example radial selection user interfaces 560A-560B with an analog watch face and an illustration of the time-based events staying stationary, but updating, around the radial selector as time passes, in accordance with one or more of the techniques described herein. User interfaces 560A and 560B may be output on a UI component of a computing device, such as UI component 212 of computing device 210. User interfaces 560A and 560B include radial selection element 564 and various event indications 566A-566P (collectively, indications 566). Each of indications 566 is associated with a particular time-based event, each of which has a particular duration. A size of each respective indication 566 (e.g., the length of the inner arc of indication 566) is proportional to the duration of the associated time-based event. User interfaces 560A and 560B includes event information 562A and 562B, respectively, which include information of a particular one of indications 566 that is currently playing or selected by radial selection element 564 (i.e., indication 566I and 566M, respectively). User interfaces 560A and 560B also include icons 568A-568D (collectively, icons 568). Each of icons 568 may present a different interface within the application when selected.

In the example of FIG. 5, the dynamic play/pause button 580 is not located within the analog clock face, but instead near event information 562A and 562B. In this manner, such an indication may be generated anywhere on screen that is suitable for such an indication. In the example of FIG. 5, graphical user interfaces 560A and 560B also include a volume icon 582, which the user may provide input on to adjust the volume of the playback. In this way, other icons other than the ones shown throughout these figures may be included in a typical graphical user interface.

Further, in the example of FIG. 5, and similar to the example of FIG. 3, graphical user interfaces 560A and 560B may include the analog clock configuration of radial selector elements 564A and 564B as the minute hand and hour hands 570A and 570B. The computing device may be configured to select the subset so that each song played in the previous 15 minutes and each song that will play in the next 45 minutes is dynamically included in the subset that is ultimately displayed in the manner described throughout.

As such, at time 11:30, the computing device is playing the song associated with graphical representation 566I. The previous songs that have been played in the prior 15 minutes include the songs associated with graphical representations 566E-566H. As a note, it is not necessary that graphical representation 566E is a complete representation of the song associated with graphical representation 566E. If the song associated with graphical representation 566E began playing prior to 11:15, the computing device may truncate graphical representation 566E to the 11:15 mark as that is 15 minutes prior to the current time.

As the computing device continues to play the songs associated with the various graphical representations for another 15 minutes, as shown in graphical user interface 560B, the graphical representations of the songs played between 11:15 and 11:30 (i.e., graphical representations 566E-566H) are removed and replaced with graphical representations of the songs that will be played between 12:15 and 12:30 (i.e., graphical representations 566Q-566S), as that time frame is now included in the "within the next 45 minute" time frame. As a note, it is not necessary that graphical representation 566S is a complete representation of the song associated with graphical representation 566S. If the song associated with graphical representation 566S continues playing after 12:30, the computing device may truncate graphical representation 566S to the 12:30 mark as that is 45 minutes prior to the current time.

Figure 6A:
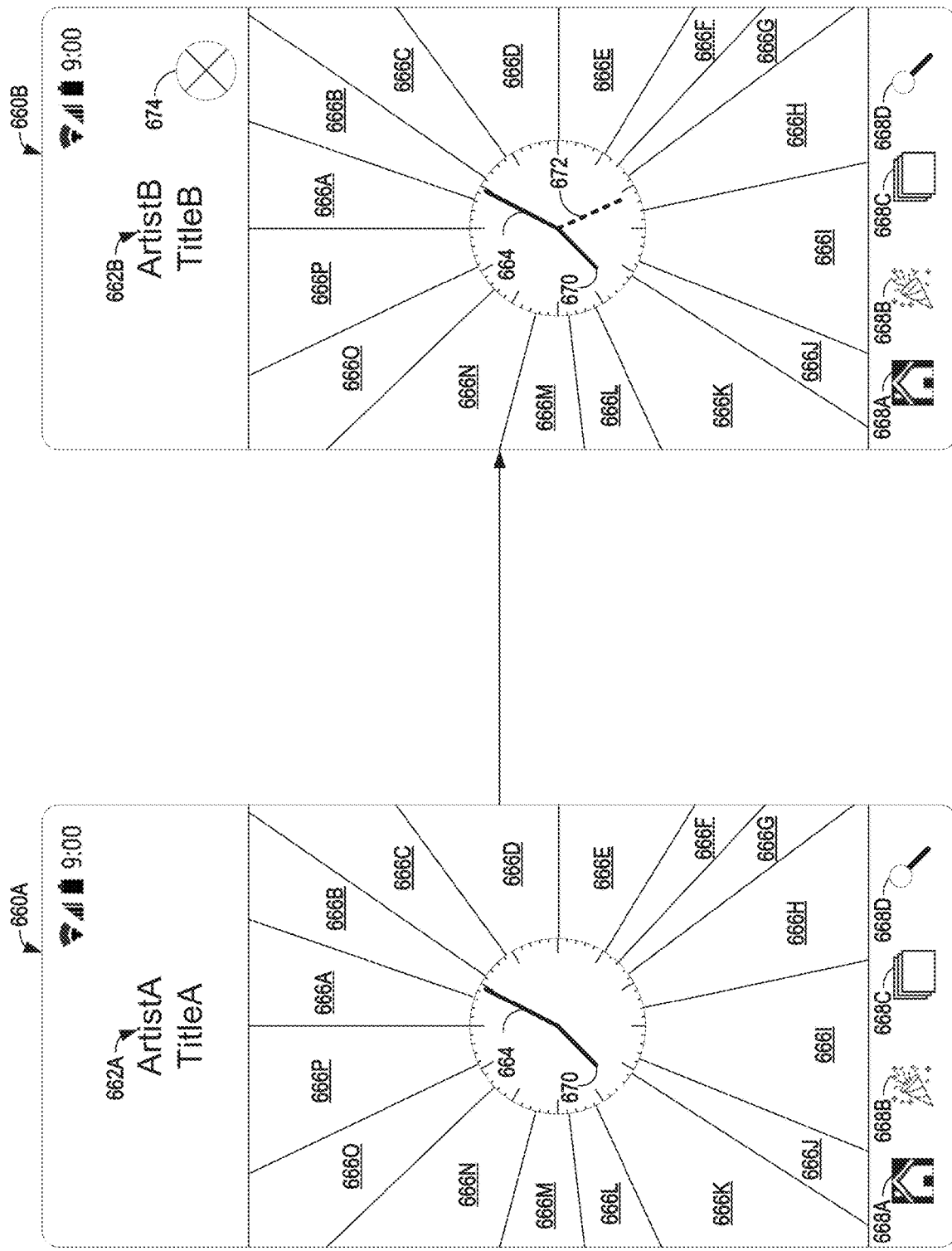
FIGS. 6A-6B are example radial selection interfaces with an analog watch face as the user uses the minute hand of the watch face to scroll and select a different time-based element, in accordance with one or more of the techniques described herein.
Figure 6B:
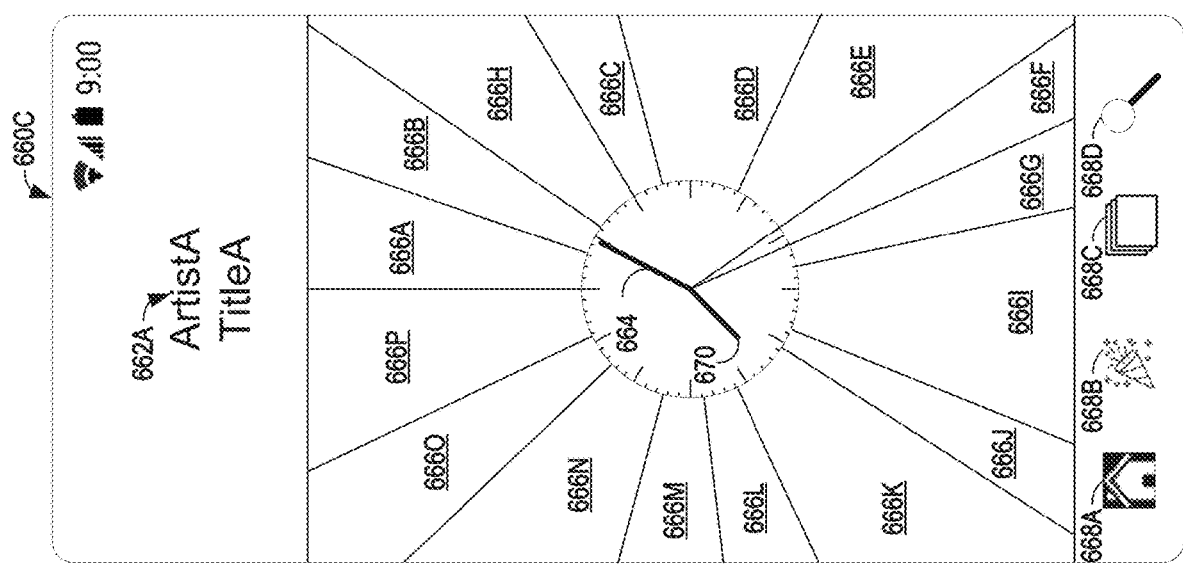

FIGS. 6A-6B are example radial selection user interfaces 660A-660C with an analog watch face as the user uses the minute hand of the watch face to scroll and select a different time-based element, in accordance with one or more of the techniques described herein. User interface 660A-660C may be output on a UI component of a computing device, such as UI component 212 of computing device 210. User interfaces 660A-660C include radial selection element 664 and various event indications 666A-666P (collectively, indications 666). Each of indications 666 is associated with a particular time-based event, each of which has a particular duration. A size of each respective indication 666 (e.g., the length of the inner arc of indication 666) is proportional to the duration of the associated time-based event. User interfaces 660A-660C include event information 662A, 662B, and 662A again, respectively, which each include information of a particular one of indications 666 that is currently playing or selected by radial selection element 664 (i.e., indication 666B, 666H, and 666B again, respectively). User interfaces 660A-660C also include icons 668A-668D (collectively, icons 668). Each of icons 668 may present a different interface within the application when selected.

In the initial graphical user interface 660A, the song associated with graphical representation 666B is playing.

While the computing device is playing the song associated with graphical representation 666B, the computing device receives an indication of user input at radial selector 664 and begins to swipe radially around the analog clock face to select another graphical representation (and, accordingly, another song).

To track the radial gesture, the computing device may simply move radial selector 664 to follow the gesture. In other examples, such as the example of FIG. 6A, the computing device may instead output dotted element 672, or some other element that is visually distinct from radial selector 664, to track the gesture as it moves radially around the analog clock face. While the example of FIG. 6A describes outputting dotted element 672 when radial selector 664 is selected via user input, in other examples, the user may not need to provide input on radial selector 664 at first. Rather, if the computing device receives an indication of user input interacting with any portion of the watch face, the computing device may output dotted element 672 extending from the center of the watch face and through the point where the input is received towards one of graphical representations 666.

Also, in the example of graphical user interface 660B, a cancel icon 674 may be output. In the instance that a user decides they do not wish to perform an action on any subsequent song after selecting the radial selector 664, the user may instead navigate their input tool to cancel icon 674 to cancel the input.

In the example of FIG. 6A, the user drags dotted element 672 to point at graphical representation 666H. Event information 662B is updated to show the information of the song associated with graphical representation 666H. At this point, the user releases the gesture.

In response to the user releasing the gesture, the computing device detects that the indication of user input has ended. As such, the computing device generates and outputs graphical user interface 660C. As part of generating graphical user interface 660C, the computing device performs an action on the song associated with graphical representation 666H. In the example of FIG. 6B, the action includes changing the position of the song associated with graphical representation 666H in the list to be directly after the song associated with graphical representation 666B. In other examples, the computing device can immediately begin playing the song associated with graphical representation 666H, skipping the remainder of the song associated with graphical representation 666B and thereby truncating graphical representation 666B at the current time (i.e., 7:05). In still other examples, the computing device can remove the remainder of the song associated with graphical representation 666B, the song associated with graphical representation 666D, the song associated with graphical representation 666E, the song associated with graphical representation 666F, and the song associated with graphical representation 666G from the list, thereby skipping those songs and immediately playing the song associated with graphical representation 666H, moving each subsequent song up in the list.

While the example of FIGS. 6A and 6B describes an action that is performed on graphical representation 666H, in other instances, the computing device may only display event information 662B when radial selection element 664 or dotted element 672 (depending on the specific implementation) is directed towards graphical representation 666H. Upon release of the user input on radial selection element 664 or dotted element 672, no action may be performed, and radial selection element 664 may simply return to the original angular position (or dotted element 672 may disappear) without changing the positions of any of the time-based events associated with graphical representations 666. Instead, if the user wishes to change the position of the time-based events with any of graphical representations 666, the computing device may receive some indication of user input on the one of graphical representations 666 itself. For instance, the computing device may receive an indication of a hold-and-drag user input on graphical representation 666H, dragging graphical representation 666H to a new location within graphical user interface 660. Based on the new location of graphical representation 666H after the user input, the computing device may update the list accordingly and regenerate graphical user interface 660 based on the updated list order.

In still other instances, multiple graphical representations 666 may be moved at a same time. For instance, the computing device may receive multiple indications of tap user inputs on various graphical representations 666, thereby selecting those graphical representations. The computing device may then receive an additional indication of a hold-and-drag user input on one of the selected graphical representations, dragging each of the selected graphical representations to a new location within graphical user interface 660. Based on the new location of the selected graphical representations after the user inputs, the computing device may update the list accordingly and regenerate graphical user interface 660 based on the updated list order.

Figure 7:
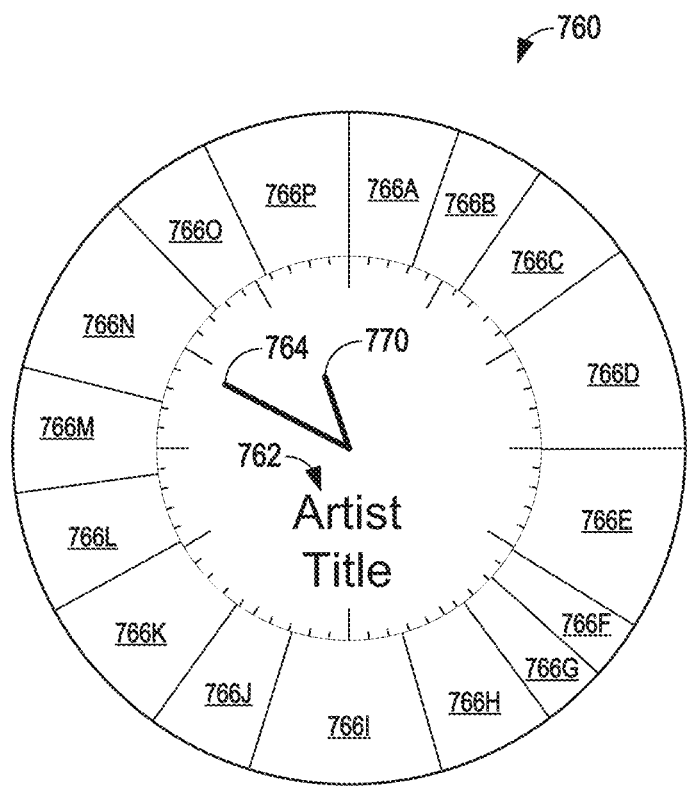
FIG. 7 is an example circular radial selection interface with an analog watch face, in accordance with one or more of the techniques described herein.

FIG. 7 is an example circular radial selection user interface 760 with an analog watch face, in accordance with one or more of the techniques described herein. User interface 760 may be output on a UI component of a computing device, such as UI component 212 of computing device 210. User interface 760 includes radial selection element 764 and various event indications 766A-766P (collectively, indications 766). Each of indications 766 is associated with a particular time-based event, each of which has a particular duration. A size of each respective indication 766 (e.g., the length of the inner arc of indication 766 or an area of the indication) is proportional to the duration of the associated time-based event. User interface 760 includes event information 762, which includes information of a particular one of indications 766 that is currently playing or selected by radial selection element 764 (i.e., indication 766N).

In the example of FIG. 7, graphical user interface 760 is a circular watch face for a circular smartwatch device. However, in other examples, the smartwatch display may have a different shape, such as a square or rectangle with rounded corners. In such instances, graphical user interface 760 may take the shape of the smartwatch display, either keeping the circular analog watch face and extending each of graphical representations 766 to the edge of the display or molding the entire shape of graphical user interface 760, including both the analog clock face and graphical representations 766, to fit the shape of the smartwatch display.

As smartwatch devices may have limited graphical real estate due to the smaller display components on such devices. In some instances, rather than using the radial selector element to select the different graphical representations 766 of time-based events, the computing device may receive inputs directly selecting one of graphical representations 766 when a user wishes to learn more information about or perform any adjustments on one of graphical representations 766. In such instances, radial selector 764 may still indicate which time-based event is currently playing, but may not be movable. While this instance is described with respect to a smartwatch device, this selection technique may be used in implementations on any devices as an alternative or additional method for selecting graphical representations 766 of various time-based events.

Figure 8:
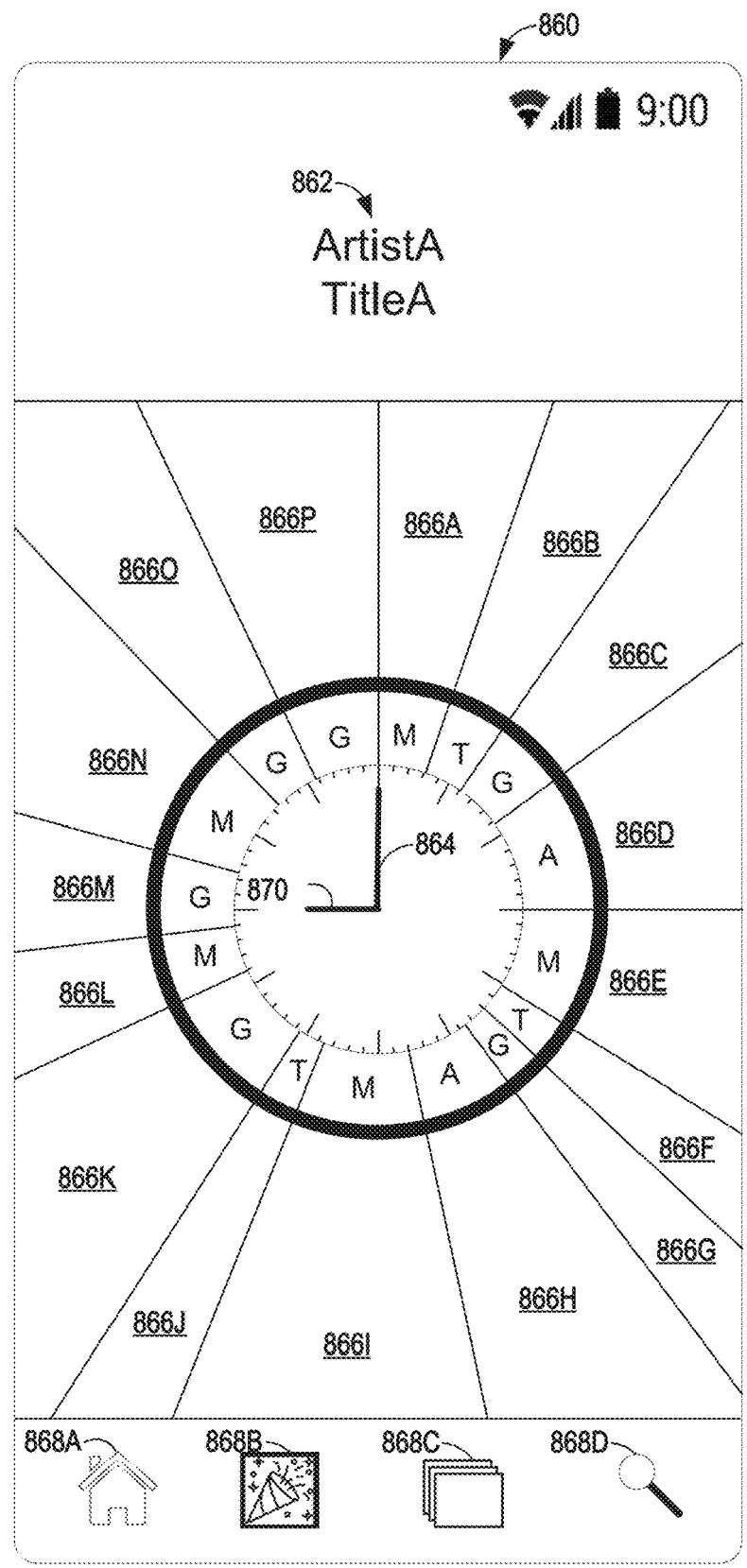
FIG. 8 is an example radial selection interface output on a host device where the time-based events are gathered from multiple users, in accordance with one or more of the techniques described herein.

FIG. 8 is an example radial selection user interface 860 output on a host device where the time-based events are gathered from multiple users, in accordance with one or more of the techniques described herein. User interface 860 may be output by the computing device when party icon 868B is selected. User interface 860 may be output on a UI component of a computing device, such as UI component 212 of computing device 210. User interface 860 includes radial selection element 864 and various event indications 866A-866P (collectively, indications 866). Each of indications 866 is associated with a particular time-based event, each of which has a particular duration. A size of each respective indication 866 (e.g., the length of the inner arc of indication 866) is proportional to the duration of the associated time-based event. User interface 860 includes event information 862, which includes information of a particular one of indications 866 that is currently playing or selected by radial selection element 864 (i.e., indication 866A). User interface 860 also includes icons 868A-868D (collectively, icons 868). Each of icons 868 may present a different interface within the application when selected.

As described throughout the disclosure, graphical representations 866 may include any information descriptive of the time-based event associated with the particular one of graphical representations 866. As the host device, the computing device in FIG. 8 may include information in the graphical representation 866 indicating which user added the respective time-based event to the compiled list. For instance, user 'M' may have included songs associated with graphical representations 866A, 866E, 866I, 866L, and 866N in their personal list. User 'T' may have included songs associated with graphical representations 866B, 866F, and 866J in their personal list. User 'G' may have included songs associated with graphical representations 866C, 866G, 866K, 866M, 866O, and 866P in their personal list. Finally, User 'A' may have included songs associated with graphical representations 866D and 866H in their personal list. When compiling this list, the host device may cycle through users M, T, G, and A, retrieving songs from their personal lists, so long as the users have songs remaining in their personal lists, until the personal list for each of users M, T, G, and A have been exhausted.

Figure 9:
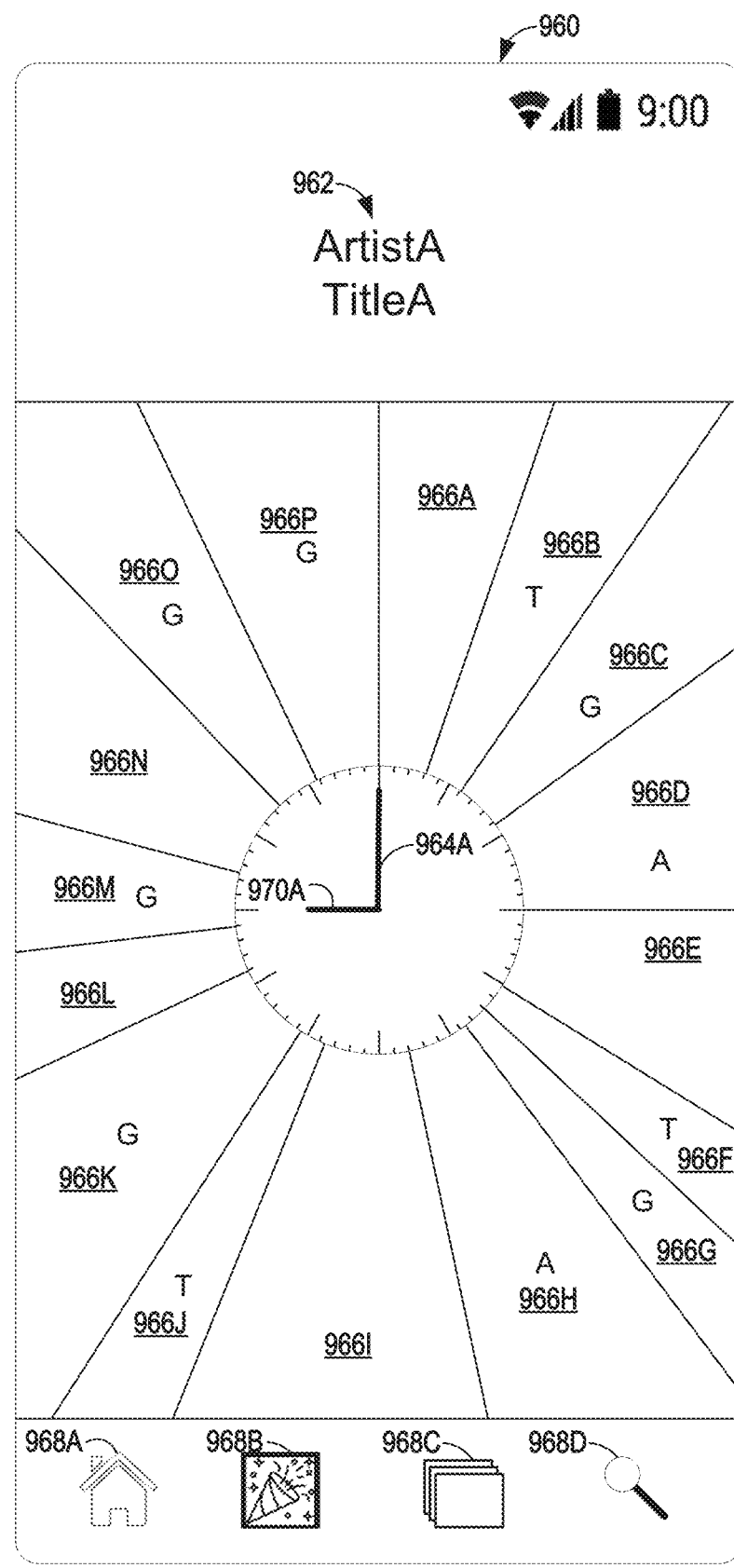
FIG. 9 is an example radial selection interface output on a secondary device where the time-based events are gathered from multiple users, in accordance with one or more of the techniques described herein.

FIG. 9 is an example radial selection user interface 960 output on a secondary device where the time-based events are gathered from multiple users, in accordance with one or more of the techniques described herein. User interface 960 may be output on a UI component of a computing device, such as UI component 212 of computing device 210. User interface 960 includes radial selection element 964 and various event indications 966A-966P (collectively, indications 966). Each of indications 966 is associated with a particular time-based event, each of which has a particular duration. A size of each respective indication 966 (e.g., the length of the inner arc of indication 966) is proportional to the duration of the associated time-based event. User interface 960 includes event information 962, which includes information of a particular one of indications 966 that is currently playing or selected by radial selection element 964 (i.e., indication 966A). User interface 960 also includes icons 968A-968D (collectively, icons 968). Each of icons 968 may present a different interface within the application when selected.

The display on a secondary device, in graphical user interface 960, may be different than graphical user interface 860 in that graphical user interface 960 may not show the full information of the upcoming songs. Instead, graphical user interface 960 may only show the user who added the song associated with the respective graphical user interface if the user of the secondary device did not add the song. For instance, if the secondary device outputting graphical user interface 960 is for user 'M' of FIG. 8, graphical user interface 960 may include full information for graphical representations 966A, 966E, 966I, 966L, and 966N, and may only include user information for the remaining graphical representations 966. Graphical user interface 960 may or may not include event information 962 when the host device is playing a song not inserted into the compiled list by the user.

Figure 10:
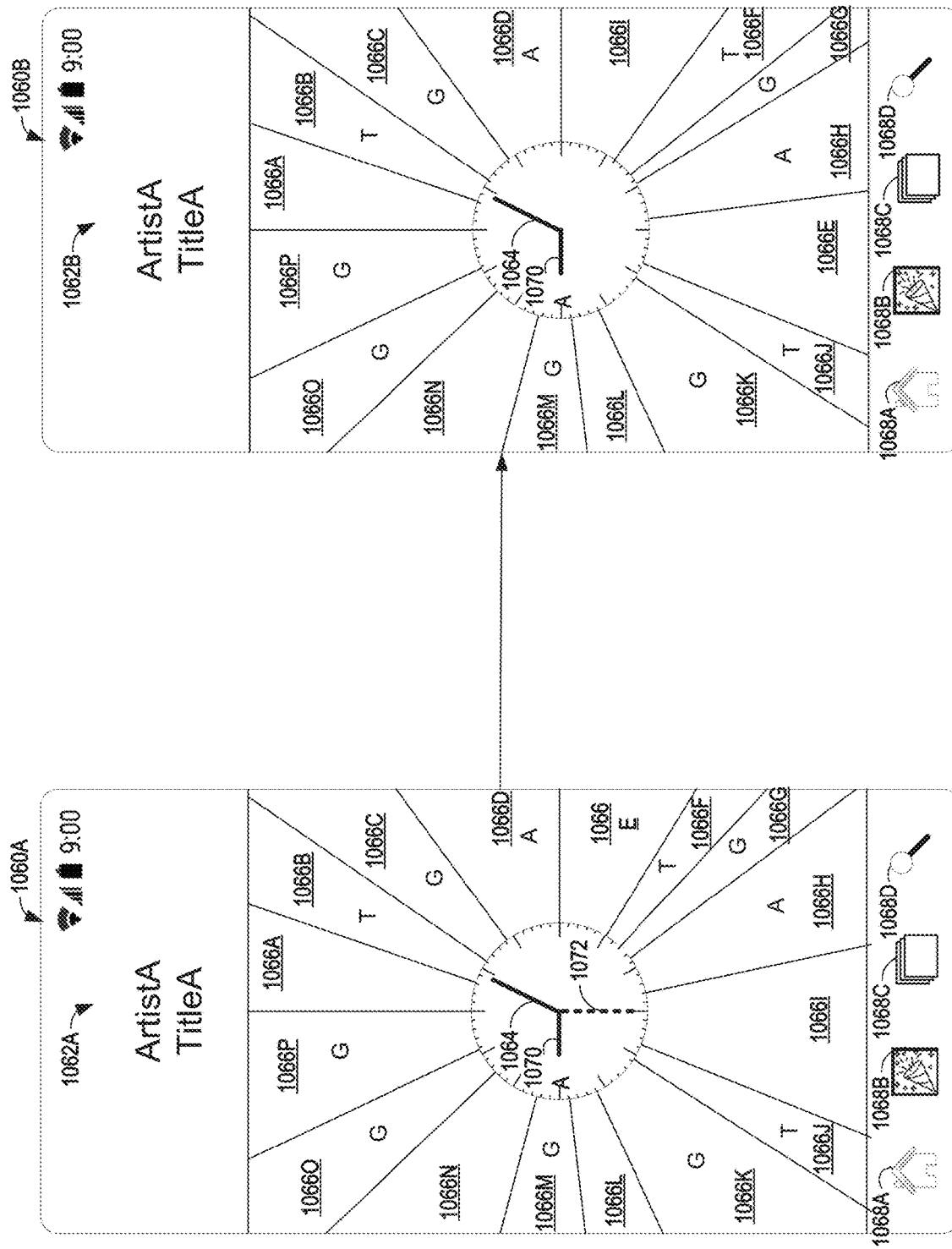
FIG. 10 is an example radial selection interface output on a secondary device where the time-based events are gathered from multiple users and where a user wishes to change the order of their events, in accordance with one or more of the techniques described herein.

FIG. 10 is an example radial selection user interface 1060 output on a secondary device where the time-based events are gathered from multiple users and where a user wishes to change the order of their events, in accordance with one or more of the techniques described herein. User interfaces 1060A and 1060B may be output on a UI component of a computing device, such as UI component 212 of computing device 210. User interfaces 1060A and 1060B include radial selection element 1064 and various event indications 1066A-1066P (collectively, indications 1066). Each of indications 1066 is associated with a particular time-based event, each of which has a particular duration. A size of each respective indication 1066 (e.g., the length of the inner arc of indication 1066) is proportional to the duration of the associated time-based event. User interfaces 1060A and 1060B include event information 1062, which includes information of a particular one of indications 1066 that is currently playing or selected by radial selection element 1064 (i.e., indications 1066I and 1066B, respectively). User interface 1060 also includes icons 1068A-1068D (collectively, icons 1068). Each of icons 1068 may present a different interface within the application when selected.

In the example of FIG. 10, the user of the secondary device outputting graphical user interfaces 1060A and 1060B may wish to dynamically change the order of their songs within the playlist. As such, at a time corresponding to the output of graphical user interface 1060A, the secondary device may receive an indication of user input at radial selector 1064, moving dotted element 1072 to point at graphical representation 1066I. The secondary device may then detect the release of the user input while dotted element 1072 is pointing at graphical representation 1066I.

In response to detecting this release of the user input, the secondary device may perform an action on the song associated with graphical representation 1066I. In the instant case, the secondary device may move the song associated with graphical representation 1066I to the slot for the user's next song in the list (i.e., the slot shown by graphical representation 1066E). As such, in graphical user interface 1060B, the secondary device generates graphical user interface 1060B to reflect the update in order without violating the order implemented by the host device, swapping the songs associated with graphical representations 1066E and 1066I.

Figure 11:
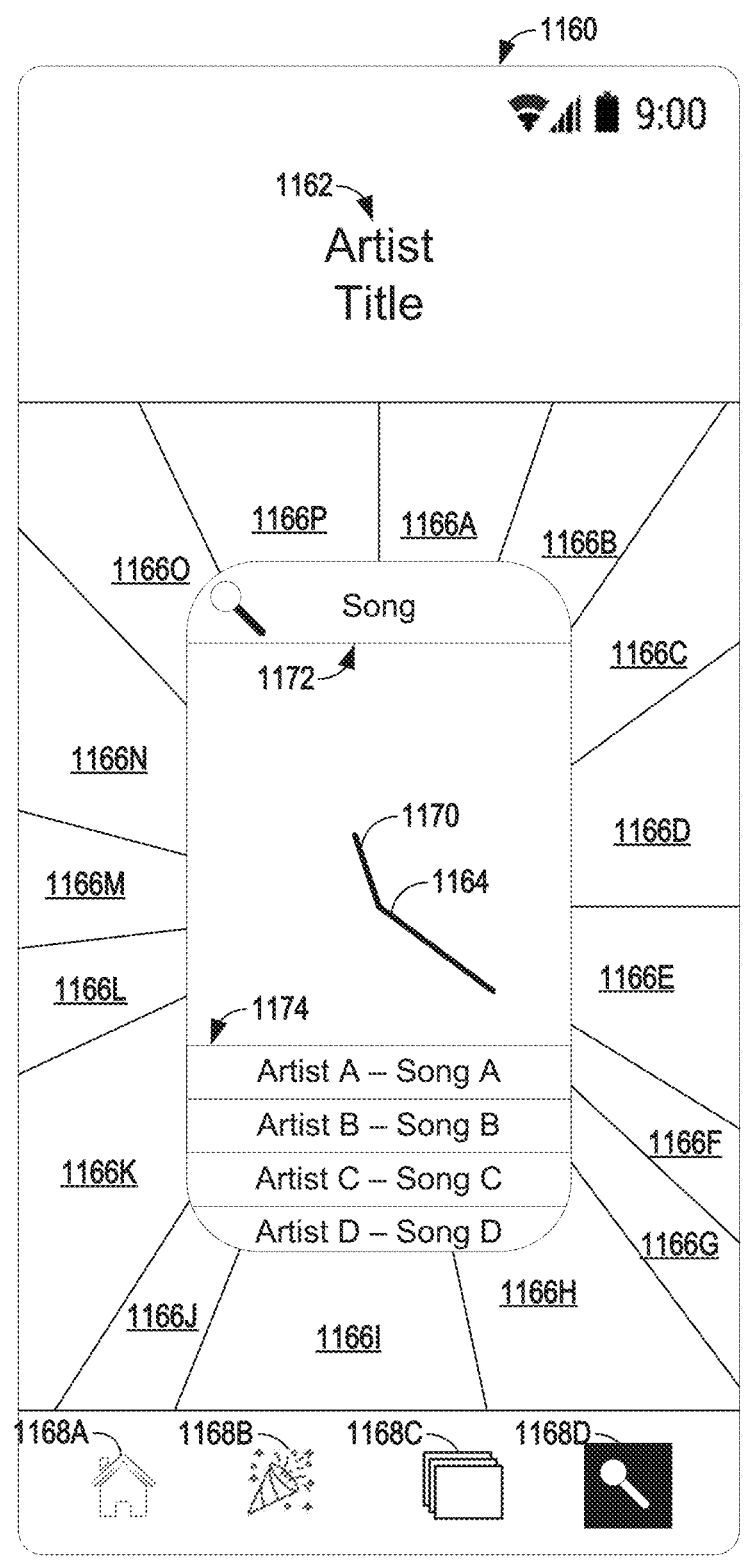
FIG. 11 is an example radial selection interface with an analog watch face and a rounded, rectangular list that may be used to add elements to the list, in accordance with one or more of the techniques described herein.

FIG. 11 is an example radial selection user interface 1160 with an analog watch face and a rounded, rectangular list that may be used to add elements to the list, in accordance with one or more of the techniques described herein. User interface 1160 may be output on a UI component of a computing device, such as UI component 212 of computing device 210. User interface 1160 includes radial selection element 1164 and various event indications 1166A-1166P (collectively, indications 1166). Each of indications 1166 is associated with a particular time-based event, each of which has a particular duration. A size of each respective indication 1166 (e.g., the length of the inner arc of indication 1166) is proportional to the duration of the associated time-based event. User interface 1160 includes event information 1162, which includes information of a particular one of indications 1166 that is currently playing or selected by radial selection element 1164 (i.e., indication 1166F). User interface 1160 also includes icons 1168A-1168D (collectively, icons 1168). Each of icons 1168 may present a different interface within the application when selected.

The example of FIG. 11 shows how a user may dynamically add songs to the list. When icon 1168D is selected, the analog clock face may change to be a different shape, such as a rounded rectangle. While shown in this instance as a different shape, it should be understood that the shape that includes radial selector 1164 may be any shape at any time during any of the functions described in respect to any other figure, at any time, including squared rectangles, rounded rectangles, circles, ovals, or any other shape suitable to enclose radial selector 1164.

Graphical user interface 1160 shows search field 1172, where a user may search for additional songs to add to the playlist shown in graphical user interface 1160. In the example of FIG. 11, search field 1172 includes the phrase "Song", and search results field 1174 includes various songs with the phrase "Song" in the title. The user may select any of these songs and drag and drop them into the radial interface at the location the user wishes to hear the song. The computing device may update the list, and thereby update the subset of the list and the graphical user interface, as needed based on the location of where the user drops the newly added song.

While the example of FIG. 11 shows an instance where the analog clock face is still visible, in other examples, this configuration may look different. For instance, one of search field 1172 or search results field 1174 may cover the entirety of the analog clock face in other examples. In some other instances, a graphical keyboard may be displayed that covers some portion of graphical user interface 1160.

Figure 12:
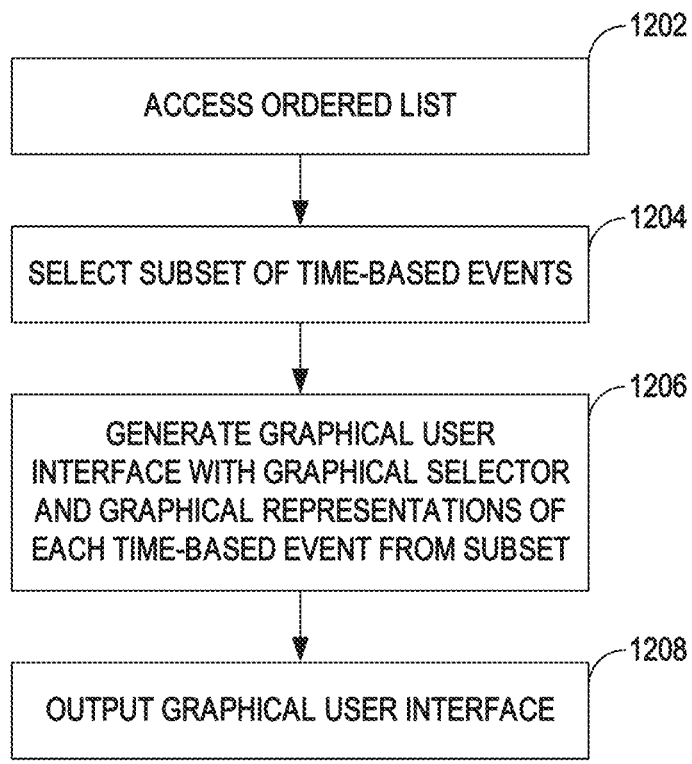
FIG. 12 is a flow diagram illustrating an example process for determining and outputting a radial interface for time-based events, in accordance with one or more of the techniques described herein.

FIG. 12 is a flow chart illustrating an example mode of operation. The techniques of FIG. 12 may be performed by one or more processors of a computing device, such as computing device 110 of FIG. 1 and/or computing device 210 illustrated in FIG. 2. For purposes of illustration only, the techniques of FIG. 12 are described within the context of computing device 210 of FIG. 2, although computing devices having configurations different than that of computing device 210 may perform the techniques of FIG. 12.

In accordance with the techniques described herein, timing module 224 accesses a list that includes a plurality of time-based events (1202). Each time-based event has a particular duration. Timing module 224 selects, based at least in part on the list and the duration of each time-based event, a subset of time-based events from the plurality of time-based events (1204). The subset of time-based events from the plurality of time-based events is determined such that a sum of the durations for each respective time-based event in the subset of time-based events is less than or equal to an hour. Further, an order of the time-based events in the subset of time-based events is a same order as an order in the list. UI module 222 generates a graphical user interface that includes a graphical selector and a number of graphical representations equal to the number of time-based events in the subset of time based events (1206), each graphical representation corresponding to a different time-based event from the subset of time-based events. A size of each graphical representation is proportional to the duration of the time-based event corresponding to the respective graphical representation. Further, the graphical representations are arranged at least partially around the graphical selector. UI module 222 outputs, for display on UI component 212, the graphical user interface (1208).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
accessing, by one or more processors of a computing device, a list that includes a plurality of time-based events, wherein each time-based event has a particular duration;
selecting, by the one or more processors, and based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, wherein the plurality of time-based events includes at least one time-based event not included in the subset of time-based events, and wherein an order of the time-based events in the subset of time-based events is a same order as an order in the list;
generating, by the one or more processors, a graphical user interface that includes a graphical selector and a graphical representation for each of the time-based events in the subset of time-based events, wherein a number of graphical representations generated is equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector; and
outputting, by the one or more processors and for display on a display component, the graphical user interface.

2. The method of claim 1, further comprising:
determining, by the one or more processors a current time, wherein the graphical selector comprises a minute hand of an analog clock, wherein the analog clock shows the current time in the graphical user interface, and wherein each of the graphical representations are sized and arranged such that the graphical selector points towards the graphical representation when the respective time-based event associated with the graphical representation is to occur.

3. The method of claim 2, wherein the subset of time-based events include each time-based event scheduled to occur within 45 minutes of the current time and each time-based event that occurred within the 15 minutes prior to the current time.

4. The method of claim 2, wherein the subset of time-based events include each time-based event scheduled to occur within 30 minutes of the current time and each time-based event that occurred within the 30 minutes prior to the current time.

5. The method of claim 2, wherein the subset of time-based events include each time-based event scheduled to occur within 60 minutes of the current time.

6. The method of claim 2, wherein the subset of time-based events include each time-based event scheduled to occur during the hour of the current time.

7. The method of claim 1, wherein the graphical selector is initially positioned in a static direction, wherein the graphical representations cycle around the graphical selector as time passes.

8. The method of claim 1, further comprising:
updating, by the one or more processors and after a first time-based event has concluded, the graphical user interface to include a second time-based event from the list in place of the first time-based event from the list.

9. The method of claim 1, wherein the subset of time-based events includes a portion of a first time-based event such that the sum of the durations for each respective time-based event fully included in the subset of time-based events and the duration of the portion of the first time-based event is equal to the hour.

10. The method of claim 1, wherein the graphical selector includes a first endpoint fixed in the graphical user interface, wherein the first endpoint is an endpoint of the graphical selector farthest away from the graphical representations of the time-based events, wherein the graphical selector is at a first angular position in the graphical user interface, and wherein the method further comprises:
receiving, by the one or more processors, an indication of user input at a portion of the graphical user interface corresponding to the graphical selector, wherein the indication of user input comprises a radial gesture moving the graphical selector around the first endpoint in the graphical user interface;
detecting, by the one or more processors, that the indication of user input is no longer being received; and
outputting, by the one or more processors, a subsequent graphical user interface with the graphical selector at the first angular position.

11. The method of claim 10, wherein the first angular position comprises one of a static direction or a representation of an amount of minutes in a current time.

12. The method of claim 10, further comprising:
detecting, by the one or more processors, a first graphical representation, associated with a first time-based event, that the graphical selector is pointing towards upon the detection of the indication of user input no longer being received;
selecting, by the one or more processors, the first time-based event; and
performing, by the one or more processors, an action using the first time-based event.

13. The method of claim 12, wherein the action comprises one of:
moving, by the one or more processors, a position of the first time-based event within the list such that the first time-based event is inserted in place of a current time-based event selected by the graphical selector when the graphical selector is in a first position and updating, by the one or more processors, the graphical user interface to reflect the updated list;
moving, by the one or more processors, the position of the first time-based event within the list such that the first time-based event is inserted immediately after a current time-based event selected by the graphical selector when the graphical selector is in the first position and updating, by the one or more processors, the graphical user interface to reflect the updated list; or
skipping, by the one or more processors, every time-based event between the current time-based event and the first time-based event in the list, selecting, by the one or more processors, and based at least in part on the list and the duration of each time-based event, a second subset of time-based events from the plurality of time-based events beginning with the first time-based event, wherein the second subset of time-based events from the plurality of time-based events is determined such that a sum of the durations for each respective time-based event in the second subset of time-based events is less than or equal to an hour, and wherein an order of the time-based events in the second subset of time-based events is a same order as the order in the list, and updating, by the one or more processors, the graphical user interface to reflect the second subset of time-based event.

14. The method of claim 10, further comprising:
while receiving the indication of user input, updating, by the one or more processors, and based on a current angular position of the graphical selector during the user input causing the graphical selector to point towards a first time-based event, the graphical user interface such that the graphical user interface displays the graphical representation for each time-based event in the plurality of time-based events that occur within a first amount of time after the first time-based event and the graphical representation for each time-based event in the plurality of time-based events that occur within a second amount of time prior to the first time-based event,
wherein the first amount of time and the second amount of time are such that:
wherein the first amount of time comprises one of 15 minutes, 30 minutes, 45 minutes, or an hour, wherein the second amount of time comprises 0 minutes, 15 minutes, 30 minutes, or 45 minutes, or
wherein the first amount of time and second amount of time are dynamic amounts of time such that a sum of the first amount of time and second amount of time are equal to 60 minutes and such that the first amount of time is equal to a number of minutes that, when added to a minutes portion of a time indicated by the current angular position, cause the summed minutes to equal 60 minutes.

15. The method of claim 1, further comprising:
adding, by the one or more processors, a new time-based event to the list;
determining, by the one or more processors and based on the subset of time-based events, whether the new time-based event is set to occur prior to a final time-based event in the subset of time-based events;
responsive to determining that the new time-based event is set to occur prior to a final time-based event in the subset of time-based events:

selecting, by the one or more processors, and based at least in part on the updated list and the duration of each time-based event, a second subset of time-based events from the plurality of time-based events, wherein the second subset of time-based events includes the new time-based event, wherein the second subset of time-based events from the plurality of time-based events is determined such that a sum of the durations for each respective time-based event in the second subset of time-based events is less than or equal to an hour, and wherein an order of the time-based events in the second subset of time-based events is a same order as the order in the list;

generating, by the one or more processors, an updated graphical user interface that includes the graphical selector and a number of graphical representations equal to the number of time-based events in the second subset of time based events, each graphical representation corresponding to a different time-based event from the second subset of time-based events, wherein a size of each graphical representation is proportional to the duration of the time-based event corresponding to the respective graphical representation, and wherein the graphical representations are arranged at least partially around the graphical selector; and outputting, by the one or more processors and for display on the display component, the updated graphical user interface.

16. The method of claim 1, wherein each time-based event in the plurality of time-based events comprises one or more of a song, a podcast, a video, a picture in a slide of a slideshow, a calendar event, an appointment, an audio book, an audio recording, a planned refrain from audio or video, a scientific event, or an access priority, and wherein the list comprises a specific sequence of the time-based events to occur consecutively.

17. The method of claim 1, further comprising:
inserting, by the one or more processors, an overlapping transitional effect near a conclusion of a first time-based event in the subset of time-based events, wherein the overlapping transitional effect continues into a beginning portion of a second time-based event immediately following the first time-based event in the subset of time-based events,
wherein the overlapping transitional effect comprises one or more of an overlapping of the first time-based event and the second time-based event, a cutting of the first time-based event and the second time-based event, a splicing of the first time-based event and the second time-based event, a fading of the first time-based event into the second time-based event, or a joining of the first time-based event and the second time-based event.

18. The method of claim 1, wherein the computing device comprises one of a smartphone, a tablet, a laptop, a desktop, a smartwatch, a smart refrigerator, a smart appliance, a musical instrument, a server device, or a cloud device.

19. The method of claim 1, wherein the plurality of time-based events comprise individual events for an individual user.

20. The method of claim 1, wherein the plurality of time-based events are compiled from a group of two or more users.

21. The method of claim 20, wherein the computing device comprises a host computing device, and wherein the method further comprises:

compiling, by the one or more processors, the list by:
determining, by the one or more processors, an order for the group of two or more users, wherein the order includes one or more indications of each user in the group of two or more users; and
while there remains indications in the order, retrieving, by the one or more processors, a next time-based event to be added to the list, the next time-based event being associated with a next user in the order for the group of two or more users, and the next time-based event being a next time-based event on a respective personal list for the next user stored on a secondary computing device associated with a next user in the order.

22. The method of claim 21, wherein the order is determined based on one or more of a total number of time-based events in the respective personal list of each user in the group of two or more users or a total duration of the time-based events in the respective personal list of each user in the group of two or more users.

23. The method of claim 20, wherein the computing device comprises a secondary computing device, and wherein the method further comprises retrieving, by the one or more processors, the list from one of a host device or a server in communication with the host device.

24. The method of claim 23, wherein each graphical representation comprises an indication of a user from the group of two or more users that inserted the respective time-based event into the list.

25. The method of claim 24, wherein each graphical representation that is associated with a time-based event that was not inserted into the list by a user of the secondary device does not include indications of the content of the respective time-based event.

26. The method of claim 20, wherein compiling the list comprises:
while at least one user has a time-based event in a respective personal list that has not been inserted into the list:
cycling, by the one or more processors, through each of the group of two or more users;
if a next user in the cycle has a time-based event in a respective personal list that has not been inserted into the list, inserting, by the one or more processors, a next time-based event from the respective personal list into the list.

27. A computing device comprising:
a memory configured to store one or more computer-readable instructions; and
a processor configured to execute the one or more computer-readable instructions to:
access a list that includes a plurality of time-based events, wherein each time-based event has a particular duration;
select, based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, wherein the plurality of time-based events includes at least one time-based event not included in the subset of time-based events, and wherein an order of the time-based events in the subset of time-based events is a same order as an order in the list;

generate a graphical user interface that includes a graphical selector and a graphical representation for each of the time-based events in the subset of time-based events, wherein a number of graphical representations generated is equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector; and output, for display on a display component, the graphical user interface.

28. A non-transitory computer-readable storage medium comprising instructions that, when executed, cause one or more processors of a computing device to:

access a list that includes a plurality of time-based events, wherein each time-based event has a particular duration;

select, based at least in part on the list and the duration of each time-based event, a subset of time-based events from the plurality of time-based events, wherein the subset of time-based events from the plurality of time-based events is determined such that a sum of the durations for each respective time-based event in the subset of time-based events is less than or equal to an hour, wherein the plurality of time-based events includes at least one time-based event not included in the subset of time-based events, and wherein an order of the time-based events in the subset of time-based events is a same order as an order in the list;

generate a graphical user interface that includes a graphical selector and a graphical representation for each of the time-based events in the subset of time-based events, wherein a number of graphical representations generated is equal to the number of time-based events in the subset of time based events, each graphical representation corresponding to a different time-based event from the subset of time-based events, wherein a size of each graphical representation is proportional to the duration of the time-based event corresponding to the respective graphical representation, and wherein the graphical representations are arranged at least partially around the graphical selector; and output, for display on a display component, the graphical user interface.

* * * * *